US008645060B2

(12) United States Patent
Venkatraman

(10) Patent No.: US 8,645,060 B2
(45) Date of Patent: Feb. 4, 2014

(54) POSITIONING NETWORK AVAILABILITY AND RELIABILITY BASED ROUTING

(75) Inventor: SaiPradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 535 days.

(21) Appl. No.: 12/876,453

(22) Filed: Sep. 7, 2010

(65) Prior Publication Data

US 2012/0059578 A1 Mar. 8, 2012

(51) Int. Cl.
*G01C 21/00* (2006.01)
(52) U.S. Cl.
USPC ............ 701/468; 701/411; 701/412; 701/420; 701/421
(58) Field of Classification Search
USPC .................... 701/411, 412, 420, 421, 468; 455/456.3, 456.1, 456.2
See application file for complete search history.

(56) References Cited

U.S. PATENT DOCUMENTS

| | | | | |
|---|---|---|---|---|
| 6,556,832 | B1 * | 4/2003 | Soliman | 455/456.5 |
| 7,149,533 | B2 * | 12/2006 | Laird et al. | 455/456.3 |
| 7,180,444 | B2 * | 2/2007 | Chintyan | 342/357.31 |
| 8,165,801 | B1 * | 4/2012 | Jintaseranee et al. | 701/408 |
| 2004/0085201 | A1 * | 5/2004 | Dubrovin et al. | 340/458 |
| 2005/0075116 | A1 * | 4/2005 | Laird et al. | 455/456.3 |
| 2006/0149461 | A1 * | 7/2006 | Rowley et al. | 701/202 |
| 2009/0138199 | A1 * | 5/2009 | Bonanni et al. | 701/214 |
| 2010/0174479 | A1 * | 7/2010 | Golding et al. | 701/200 |
| 2010/0217517 | A1 * | 8/2010 | Oohashi et al. | 701/201 |
| 2010/0217524 | A1 * | 8/2010 | Oohashi et al. | 701/216 |

FOREIGN PATENT DOCUMENTS

WO WO2012033764 3/2012

OTHER PUBLICATIONS

International Search Report and Written Opinion—PCT/US2011/050552—ISA/EPO—Jan. 24, 2012, 13 pages.

* cited by examiner

*Primary Examiner* — Khoi Tran
*Assistant Examiner* — Jorge Peche
(74) *Attorney, Agent, or Firm* — DeLizio Gilliam, PLLC

(57) ABSTRACT

A routing system can be configured to determine a route based on availability and reliability of location reference devices to determine a most reliable route between a source and a destination. Visibility information that is indicative of availability of at least a threshold number of location reference devices along the route can be determined. For each of a plurality of routes between the source and the destination, a reliability rating associated with the route can be determined based on the visibility information associated with the route. The reliability rating is indicative of a reliability of the route and an ability of the routing system to maintain continuous connectivity to the at least the threshold number of location reference devices along the route. The reliability ratings of the plurality of routes are compared to identify and to present one of the plurality of routes with a highest reliability rating.

31 Claims, 8 Drawing Sheets

POSITIONING NETWORK AVAILABILITY AND RELIABILITY BASED ROUTING

BACKGROUND

Embodiments of the inventive subject matter generally relate to the field of navigation systems and, more particularly, to routing based on availability and reliability of positioning networks.

Users typically use GPS systems, handheld devices, and other routing systems to navigate from one point to another (sometimes through several intermediate points). The routing systems can receive a set of signals (e.g., navigation signals from satellites in the case of satellite-based positioning systems, radio signals from access points in the case of positioning systems based on wireless technology, etc.) for navigation purposes. The routing systems can analyze the received signals and determine timing information associated with the received signals to determine the user's position using various techniques based on time of arrival, time difference of arrival, trilateration, triangulation, etc.

SUMMARY

Various embodiments for routing based on availability and reliability of location reference devices are described herein. In one embodiment, a plurality of routes between a source location and a destination location is determined at a routing device. For each of the plurality of routes between the source location and the destination location, visibility information associated with the route is determined. The visibility information is indicative of availability of at least a threshold number of location reference communication devices along the route. The location reference communication devices communicate reference signals that enable estimating a position of the routing device. For each of the plurality of routes between the source location and the destination location, a reliability rating of the route is calculated based on the visibility information associated with the route. The reliability rating is indicative of a reliability of the route and an ability of the routing device to maintain continuous connectivity to the at least the threshold number of location reference communication devices along the route. The reliability ratings of the plurality of routes are compared to identify one of the plurality of routes with a highest reliability rating. At least the route with the highest reliability rating is presented by the routing device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
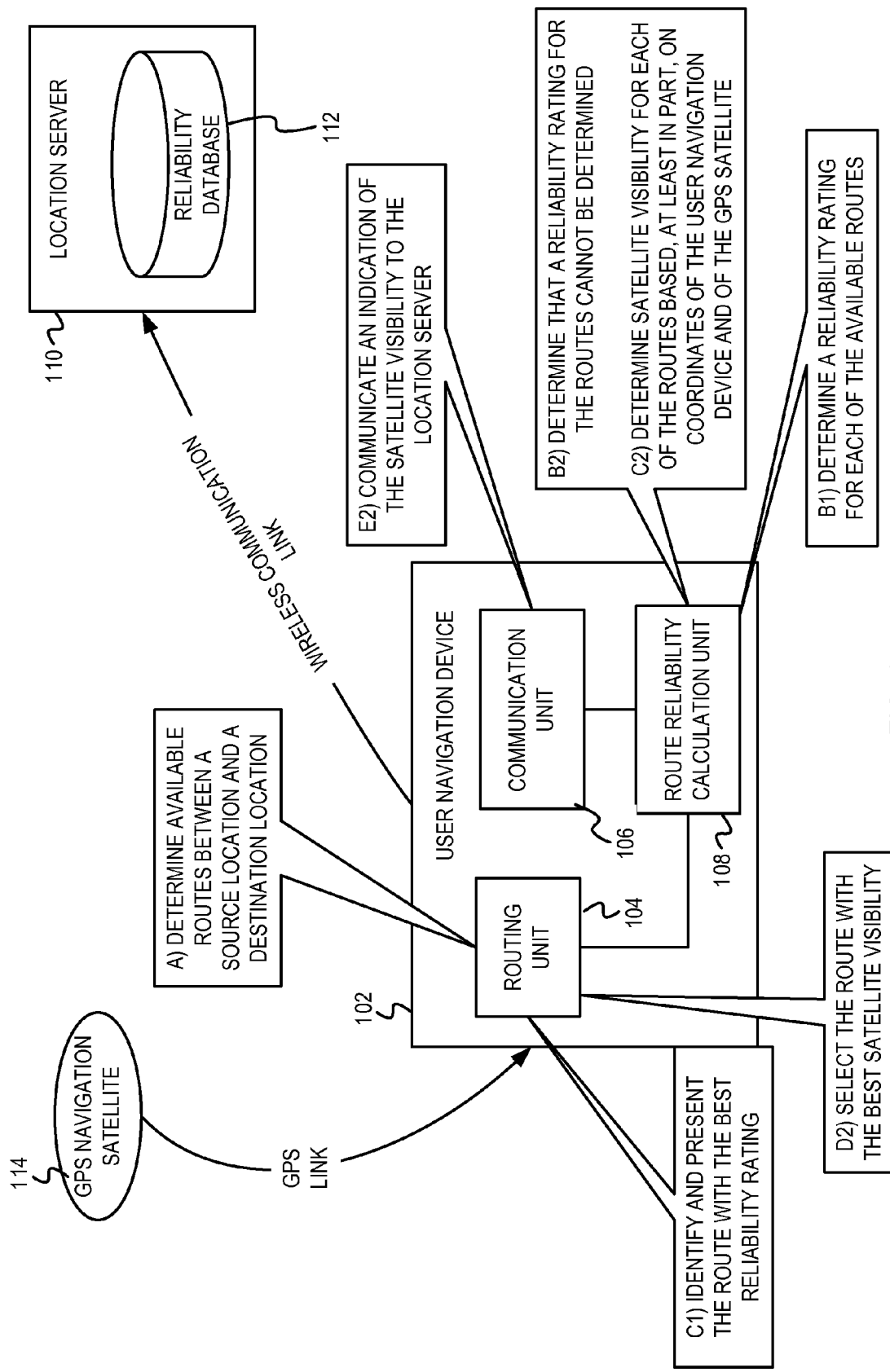
FIG. 1 depicts an example conceptual diagram illustrating routing based on availability of navigation satellites.

The description that follows includes exemplary systems, methods, techniques, instruction sequences, and computer program products that embody techniques of the present inventive subject matter. However, it is understood that the described embodiments may be practiced without these specific details. Although examples refer to a user navigation device determining a route based on visibility of global positioning system (GPS) satellites, embodiments are not so limited. In other embodiments, the user navigation device can determine the route based on visibility of satellites in any suitable satellite navigation system (e.g., global navigation satellite system (GLONASS), satellite-based augmentation system (SBAS)) or a combination of satellite navigation systems (e.g., a combination of GPS and GLONASS). Also, although examples refer to determining a most reliable route based on availability of navigation satellites and/or access points in a wireless communication network (e.g., a wireless local area network (WLAN)), in other implementations, the most reliable route can be determined based on availability of (or connectivity to) base stations in a cellular network, access points in a WiMAX network, or a combination of one or more networks (e.g., navigation satellites and a cellular network base stations). In other instances, well-known instruction instances, protocols, structures, and techniques have not been shown in detail in order not to obfuscate the description.

A routing system typically calculates a route based on information derived from roadway maps and may even have a set of routing options to automatically calculate the type of directions desired. Current routing options are useful in determining the route with the least number of miles between two points on a map, the least expensive route, or the route with the least estimated travel time between two points on a map. In some instances, routes that are determined based on these routing options lead the user through roads and areas (e.g., urban canyons with tall buildings, mountainous areas, areas with heavy foliage, etc.) where the routing system has trouble providing uninterrupted navigation service and routing directions. For example, navigation satellite visibility may be limited and there may be a perceptible reduction in the quality of user location estimates when a user is in an urban canyon or when only a partial view of the sky is visible to the routing system. This can cause problems at junctions, cross roads and other points along the route if the routing system is unable to estimate the user location. A positioning error of a few meters could cause the routing system to place the user on an incorrect street. Positioning accuracy may further be compromised by the effects of multipath (i.e., multiple reflections or refraction of navigation signals before the navigation signals are received by the routing system), as multipath can impede the ability of the routing system to accurately acquire the navigation signals. This can result in loss in quality of service and in a poor user experience.

A routing system can be configured to implement a predictive routing algorithm that generates a route based on availability of navigation satellites and quality of the navigation signals received from the navigation satellites. The availability of the navigation satellites can be determined based on the geography and topography along the route, including details of the architecture of buildings and other man-made (e.g., height of the buildings) and natural structures (e.g., mountains). Each route to a destination can be analyzed to determine a reliability rating associated with each of the routes and one or more routes with the best reliability rating can be selected for presentation by the routing system. In addition, the navigation signals received from the navigation satellites may also be supplemented by information from WLAN enabled access points. Such a predictive routing technique can present a user with a most accurate and reliable set of directions to the destination.

FIG. 1 depicts an example conceptual diagram illustrating routing based on availability of navigation satellites. FIG. 1 depicts a user navigation device 102 in communication with a GPS satellite 114 and a location server 110. The user navigation device 102 comprises a communication unit 106, a route reliability calculation unit 108, and a routing unit 104. The location server 110 comprises a reliability database 112. In one implementation, the user navigation device 102 may communicate with the location server 110 via a wireless communication link. It is noted that although FIG. 1 depicts the user navigation device 102 communicating with one GPS satellite 114, the user navigation device 102 can communicate with any suitable number of GPS satellites. Typically, the user navigation device 102 receives GPS signals from four or more GPS satellites to calculate a position of the user navigation device 102. The user navigation device 102 can determine a route from a current position of the user navigation device 102 ("source location") to a destination location based on availability/visibility of the GPS satellites as will be described in stages A, B1-C1, and B2-E2.

At stage A, the routing unit 104 determines available routes between the source location and the destination location. In one implementation, the routing unit 104 can determine a current position of the user navigation device 102 based on GPS signals received from the GPS satellites using triangulation. In another implementation, a user can manually input the source location at a user interface provided by the user navigation device 102. The user can also input the destination location and can select an option (e.g., on the user interface of the device 102) to indicate that a most reliable route between the source location and the destination location should be determined.

At stage B1, the route reliability calculation unit 108 determines a reliability rating for each of the available routes. The route reliability calculation unit 108 can transmit a message to the location server 110 requesting visibility metrics associated with each of the available routes. The visibility metrics are an indication of GPS satellite availability along the route and the quality of the GPS signals (e.g., in terms of dilution of precision, multipath, etc.) received from the GPS satellites. In some implementations, the route reliability calculation unit 108 can identify segments (or sub-sections) of each of the routes and can request visibility metrics associated with each segment of each of the available routes. For example, a route from point A to point D may be divided into three segments A-B, B-C, and C-D. Each segment A-B, B-C, and C-D of the route can be associated with visibility metrics that indicate, among other factors, visibility, availability, and geometry of satellites for each of the segments. In another implementation, the route reliability calculation unit 108 can identify the route for which visibility metrics are needed and the location server 110 can determine the segments of the route and visibility metrics associated with each segment of the route. On receiving the request for the visibility metrics, the location server 110 can access the reliability database 112 and can provide the requested visibility metrics to the route reliability calculation unit 108, as will be described in FIGS. 2-3.

The reliability database 112 can comprise visibility metrics associated with routes, segments of a route, one or more sample points along a route, etc. The visibility metrics can indicate satellite availability and estimates of quality of information received from visible GPS satellites (e.g., whether received GPS navigation signals are likely to be affected by multipath, etc.). The visibility metrics for each of the available routes or each segment of the available routes can also vary depending on weather, time of day and other atmospheric conditions. For example, for a particular segment of a route, four GPS satellites may be visible at noon, but only two GPS satellites may be visible at 8 pm. In one implementation, the reliability database 112 can be constructed using satellite observation reports transmitted by multiple user navigation devices to the location server 110. The user navigation devices may determine and report visibility metrics including positioning accuracy, visible satellites, signal to noise ratio (SNR), dilution of precision (DOP), elevation angles, etc. for the route or for each segment of the route to the location server 110. The satellite observation reports can also indicate, for a particular segment of a route, which GPS satellites are available, the time at which the visibility information was collected, speed of the user navigation device, obstacles encountered in the line of sight path of the GPS satellites, etc. The location server 110, over time, can consolidate the received satellite observation reports to construct the reliability database 112. On receiving a request for visibility metrics for a route from the user navigation device 102, the location server 110 can retrieve the consolidated visibility metrics associated with the requested route and can provide the consolidated visibility metrics to the user navigation device 102. On receiving the visibility metrics from the location server 110, the route reliability calculation unit 108 can, based on the visibility metrics, calculate a reliability rating for each of the routes. The reliability rating can be considered to be a score that represents the ability to maintain a connection with a requisite number of GPS satellites (typically 4 GPS satellites) along the route. Operations for calculating the reliability rating are further described in FIGS. 2-3.

At stage C1, the routing unit 104 identifies and presents the route with the best reliability rating. The routing unit 104 can compare reliability ratings associated with each of the routes between the source location and the destination location and can select the route with the best reliability rating. In some implementations, the routing unit 104 can select an appropriate route based on reliability of the route and other routing constraints (e.g., shortest distance, least time, etc. between the source location and the destination location). For example, the user may indicate to determine the most reliable route with the shortest distance. The routing unit 104 can select the route to satisfy both the reliability constraint and the shortest distance constraint. In one implementation, the routing unit 104 may select a route to optimize the two constraints. For example, the routing unit 104 may select a route such that the reliability rating of the route is better than a threshold reliability rating and the route distance is less than a threshold distance. As another example, the routing unit 104 may present a first route with the best reliability rating and indicate the route distance and may present a second route with the shortest distance and indicate the reliability rating of the second route. The routing unit 104 may prompt the user to select a desired route.

However, in some embodiments, if the visibility metrics for the routes are not available, the user navigation device 102 can calculate the visibility metrics as will be described in stages B2-E2.

At stage B2, the route reliability calculation unit 108 determines that a reliability rating for a route cannot be determined. For example, the route reliability calculation unit 108 may not be able to determine the reliability rating for the route because visibility metrics for the route may not be available at the location server 110, because user navigation devices may not have communicated satellite observation reports to the location server 110, and/or because the location server 110 may not have determined the visibility metrics associated with a particular route or a particular segment of the route. As another example, the visibility metrics may not be available to the route reliability calculation unit 108 for determining the reliability rating, if the communication unit 106 of the user navigation device 102 is unable to establish a communication link (in this case, a wireless communication link) with the location server 110. As another example, the location server 110 may indicate that the visibility metrics are not available if at least a threshold number of satellite observation reports for the route (or the segment of the route) were not received at the location server 110. In other words, the location server 110 may determine and store visibility metrics for a particular segment of the route if at least 1000 satellite observation reports (for the particular segment of the route and the same temporal/atmospheric conditions) were received from various user navigation devices. The location server 110 may collect at least the threshold number of satellite observation reports from the user navigation devices to ensure that the visibility metrics stored in the reliability database 112, and that are subsequently provided to the user navigation device 102, are accurate and are not an aberration.

At stage C2, the route reliability calculation unit 108 determines satellite visibility for the routes based, at least in part, on coordinates of the user navigation device 102 and of the GPS satellites 114. The route reliability calculation unit 108 can access a three-dimensional map database and can determine satellite visibility based on satellite geometry, orientation of satellites, relationship between the GPS satellites and other obstacles (e.g., buildings) as will be described with reference to FIGS. 4-5. The route reliability calculation unit 108 can determine satellite visibility for each street that is part of the available routes or for each segment (e.g., a portion of a street) of the available routes. The route reliability calculation unit 108 can provide an indication of the satellite visibility for each route to the routing unit 104. The routing unit 104 can select the route with the best satellite visibility. Additionally, as the user navigation device 102 traverses the route, the route reliability calculation unit 108 can determine and keep track of satellite availability, whether the GPS satellite 114 was reliable, visibility of GPS satellites at the corresponding time of day, etc. The route reliability calculation unit 108 can use this information to "learn" about reliable routes and to determine the best route in the future. In some implementations, the routing unit 104 can also reroute the user navigation device 102 based on the satellite availability determined while the user navigation device 102 traverses the route.

In some implementations, however, the route reliability calculation unit 108 can calculate a reliability rating associated with the route based on the determined satellite visibility. In one implementation, the route reliability calculation unit 108 can build a local reliability database (not shown) on the user navigation device 102. As the user traverses a route, the route reliability calculation unit 108 can determine visibility metrics and reliability ratings for the route and can store the visibility metrics and reliability ratings in the local reliability database. The route reliability calculation unit 108 can use the reliability ratings and/or the visibility metrics to "learn" which routes are better than other routes. The route reliability calculation unit 108 can use the reliability ratings to select a most reliable route in the future. In another implementation, the route reliability calculation unit 108 can direct the communication unit 106 to transmit the visibility metrics and/or the reliability ratings to the location server 110 as will be described below. In another implementation, in addition to providing the visibility metrics and/or the reliability ratings to the location server 110, the route reliability calculation unit 108 can also store the visibility metrics and the reliability ratings on the user navigation device 102. The route reliability calculation unit 108 can provide the reliability rating for each route to the routing unit 104. The routing unit 104 can select the route with the best reliability rating.

At stage D2, the routing unit 104 selects the route with the best satellite visibility. In some implementations, as described above, if the route reliability calculation unit 108 can determine a reliability rating for each of the routes between the source location and the destination location, the routing unit 104 can select the route with the best reliability rating.

At stage E2, the communication unit 106 communicates an indication of the satellite visibility to the location server 110. The indication of the satellite visibility may be transmitted as part of a satellite observation report. The satellite observation report can indicate positioning accuracy, visible GPS satellites, SNR of GPS signals received from the visible GPS satellites, dilution of precision, elevation angles, a time at which the aforementioned information was collected, speed of the user navigation device 102, obstacles encountered in the line of sight path of the GPS satellites, etc. If the location server 110 receives additional satellite observation reports for the same route (or segment of the route) from other user navigation devices, the location server 110 can consolidate all the received satellite observation reports to determine and store the visibility metrics in the reliability database 112. On receiving a subsequent request for the visibility metrics for the route, the location server can provide the stored visibility metrics for the route.

Although FIG. 1 depicts the user navigation device 102 executing operations described in stages B1 and C1 if the visibility metrics for all the routes are available and executing operations described in stages B2-E2 if the visibility metrics for all the routes are not available, embodiments are not so limited. In some implementations, visibility metrics may be available for some of the routes between the source location and the destination location but may not be available for other routes. For example, the routing unit 104 may identify three routes between the source location and the destination location. The route reliability calculation unit 108 may determine that visibility metrics are available (either at the location server 110 or in a local database on the user navigation device 102) for a first route and a second route. The route reliability calculation unit 108 can execute operations described in stage B1 to determine a reliability rating for the first route and the second route. The route reliability calculation unit 108 may determine that visibility metrics are not available for the third route. Accordingly, the route reliability calculation unit 108 can execute operations described in stage C2 to determine a reliability rating for the third route. The routing unit 104 can compare the reliability ratings for the three routes to identify the most reliable route.

Figure 2:
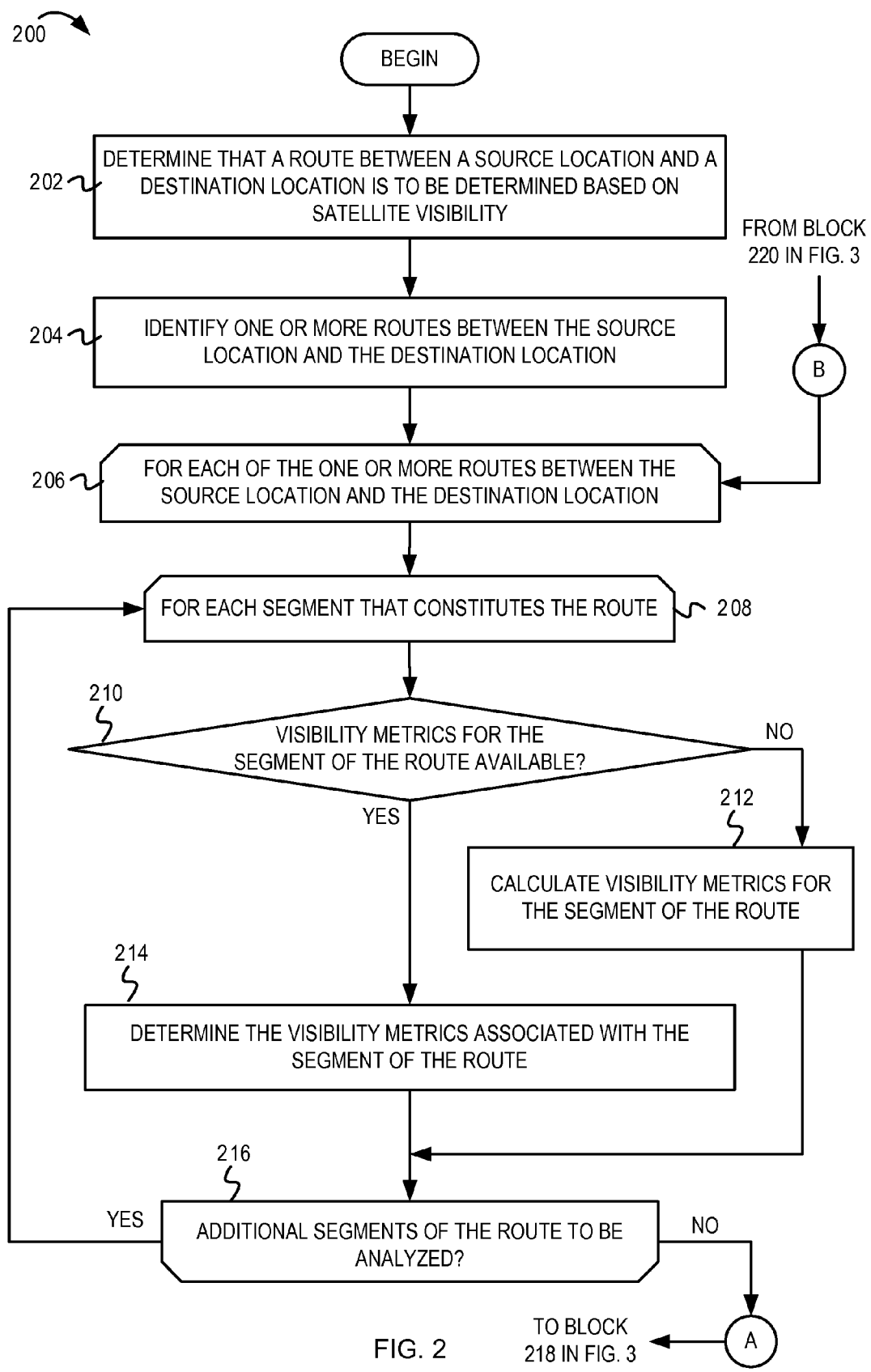
FIG. 2 is a flow diagram illustrating example operations for determining a route between a source location and a destination location based on satellite visibility.
Figure 3:
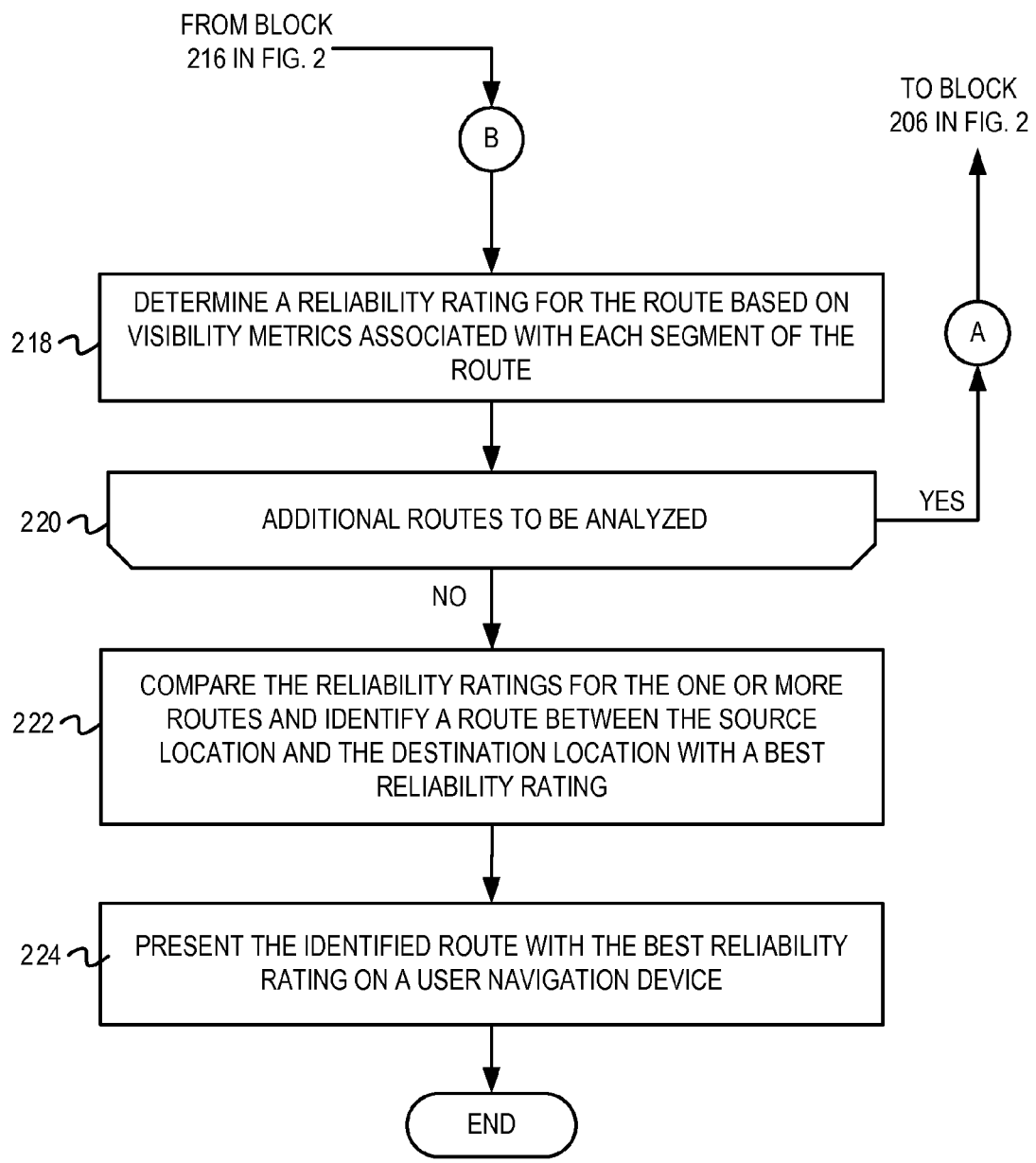
FIG. 3 is a continuation of FIG. 2 and is a flow diagram illustrating example operations for determining the route between the source location and the destination location based on satellite visibility.

FIG. 2 and FIG. 3 depict a flow diagram ("flow") 200 illustrating example operations for determining a route between a source location and a destination location based on satellite visibility. The flow 200 begins at block 202.

At block 202, it is determined that a route between a source location and a destination location is to be determined based on satellite visibility. In one implementation, the routing unit 104 of FIG. 1 determines that the route between the source location and the destination location is to be determined based on satellite visibility. For example, the user of the user navigation device 102 can input the destination location and can select an appropriate routing constraint to indicate that a most reliable route (based on satellite visibility) to the destination location is to be determined. The flow continues at block 204.

At block 204, one or more routes between the source location and the destination location are identified. For example, the routing unit 104 identifies one or more routes between the source location and the destination location. The routing unit 104 can implement any suitable routing algorithm (e.g., vector-based routing) to determine the one or more routes between the source location and the destination location. The routing unit 104 may also access cartographic maps and/or a map database to determine the one or more routes between the source location and the destination location. The flow continues at block 206.

At block 206, a loop begins for each of the one or more routes between the source location and the destination location. For example, the routing unit 104 executes operations described with reference to block 208-216 to analyze each of the routes between the source location and the destination location, to calculate a reliability rating for each of the routes, and to accordingly select the most reliable route. The flow continues at block 208.

At block 208, a second loop begins for each segment that constitutes the route. For example, the routing unit 104 identifies segments that constitute the route. The route can be divided into a series of contiguous segments or sub-sections and operations described in blocks 210-214 can be executed to determine visibility metrics for each segment of the route. In one implementation, each road of the route may be considered to be a segment of the route. For example, the route may comprise travelling for 10 miles on road A, turning into road B, and travelling for 5 miles on road B. Thus, the 10 miles of road A can constitute one segment of the route, while the 5 miles of road B can constitute a second segment of the route. In another implementation, the segment may be a known length of the route. For example, segments of the route may be set to be 5 mile stretches of the roads that constitute the route. Thus, if the route comprises travelling for 10 miles on road A and travelling for 5 miles on road B, the first 5 miles of road A can constitute one segment of the route, the next 5 miles of road A can constitute a second segment of the route, and the 5 miles of road B can constitute a third segment of the route. The flow continues at block 210.

At block 210, it is determined whether visibility metrics for the segment of the route are available. For example, the routing unit 104 can query the route reliability calculation unit 108 to determine whether the visibility metrics for the segment of the route are available at the user navigation device 102. As another example, the routing unit 104 can query the location server 110 (e.g., the reliability database 112 of the location server 110) to determine whether the visibility metrics for the segment of the route are available. The visibility metrics can comprise an indication of satellite availability, satellite visibility, dilution of precision (DOP), SNR of received GPS signals, and other quality estimates for the segment of the route.

Satellite availability can represent a number of GPS satellites at a given location of the user navigation device 102 that are visible at or above a predefined angle above the horizon with respect to the user navigation device 102. The satellite availability can be calculated at the user navigation device 102 as will be described with reference to FIGS. 4-5. Dilution of precision is a measure of the effect of GPS satellite geometry on the precision/accuracy of location measurements calculated at the user navigation device 102 and of the quality of the GPS signals received from the GPS satellites. The precision of the location measurements may be affected by the position of the GPS satellites relative to each other and relative to the user navigation device 102. For example, if visible GPS satellites are close together in the sky, the geometry is considered to be weak and consequently a high dilution of precision value may be associated with the location measurements. A low dilution of precision value associated with the location measurements can represent a high accuracy of the location measurements (e.g., because of a wide angular separation between the visible GPS satellites used to obtain the location measurements). Obstacles (e.g., buildings, foliage, etc.) in a line of sight path between the user navigation device 102 and the visible GPS satellites may affect the precision of the location measurements and the dilution of precision value associated with the location measurements. The number of visible GPS satellites may also influence the precision of the location measurements.

The visibility metrics can also indicate the time of day and other factors that can affect satellite visibility. In some implementations, the visibility metrics may indicate an average availability for the segment of the route at various times of day or during certain time intervals. The visibility metrics can be used to determine "blind spots" along the route and whether poor visibility of the GPS satellites or high multipath (and hence unreliable routing information) can be expected. If it is determined that the visibility metrics for the segment of the route are available, the flow continues at block 214. Otherwise, the flow continues at block 212.

At block 212, visibility metrics for the segment of the route is calculated. For example, the route reliability calculation unit 108 calculates the visibility metrics for the segment of the route. The flow 200 moves from block 210 to block 212 on determining that the visibility metrics for the segment of the route cannot be identified at the location server 110 or at the user navigation device 102. For example, the visibility metrics may not be available at the location server 110 if a sufficient number of satellite observation reports for the segment of the route at a requisite time of day (e.g., an estimated time at which the user navigation device will traverse the segment of the route) were not received at the location server 110. As another example, the visibility metrics may not be available at the location server 110 if the user navigation device 102 cannot establish a communication link (e.g., a WLAN communication link, a WiMAX communication link, etc.) with the location server 110.

The route reliability calculation unit 108 can calculate the visibility metrics including satellite availability, satellite visibility, dilution of precision (DOP), and other quality estimates at various sample points along the segment of the route. In one implementation, the sample points may be selected so that each sample point is at a fixed distance from a previous and a subsequent sample point. In another implementation, the distance between successive sample points may be configurable. For example, a user may manually configure the distance between successive sample points. As another example, the distance between successive sample points may be dynamically adjusted depending on whether the user navigation device 102 is in an environment with potentially low satellite visibility (e.g., an urban canyon), depending on whether the route is a simple or complicated route, etc. In one implementation, the route reliability calculation unit 108 may determine satellite visibility along the segment of the route as described with reference to FIGS. 4-5 and the routing unit 104 may select the route with the best satellite visibility. The flow continues at block 216.

At block 214, the visibility metrics associated with the segment of the route are determined. The flow moves from block 210 to block 214 on determining that the visibility metrics associated with the segment of the route are available. In one implementation, the routing unit 104 may receive the visibility metrics associated with the segment of the route from the location server 110. In another implementation, the routing unit 104 may determine whether previously calculated or previously downloaded visibility metrics associated with the segment of the route are available at the user navigation device 102. If the visibility metrics are available at the user navigation device 102, the communication unit 106 may not connect to the location server 110 and may not transmit a request for the visibility metrics associated with the segment of the route. Instead, the routing unit 104 may access a local reliability database on the user navigation device 102 to determine stored visibility metrics associated with the segment of the route. If the visibility metrics are not available at the user navigation device 102, the communication unit 106 can connect to the location server 110 and the visibility metrics associated with the segment of the route can be downloaded from the location server 110. The flow continues at block 216.

At block 216, it is determined whether additional segments of the route are to be analyzed. For example, the routing unit 104 determines whether additional segments of the route are to be analyzed. If it is determined that additional segments of the route are to be analyzed, the flow loops back to block 208, where a next segment of the route is identified and operations described with reference to blocks 210-214 are executed for the next segment of the route. Otherwise, the flow continues at block 218 in FIG. 3.

At block 218, a reliability rating for the route is determined based on the visibility metrics associated with each segment of the route. For example, the routing unit 104 determines the reliability rating for the route based on the visibility metrics associated with each segment of the route. The reliability rating can be a score within a predetermined range that indicates the likelihood of maintaining continuous connectivity with four or more GPS satellites along the route and also indicates the reliability of routing directions determined along the route. For example, the reliability rating may be a score between 1 and 10, where a reliability rating of 10 represents the most reliable route and a reliability rating of 1 represents the least reliable route. The routing unit 104 can calculate the reliability rating by assigning a value to each of the visibility metrics associated with each segment of the route and calculating a sum of the assigned values. For example, for satellite visibility, the routing unit 104 may assign a value that is dependent on the number of visible GPS satellites. Thus, if 4 GPS satellites are visible at a first segment of the route, a value of "4" may be assigned to the first segment of the route. If 2 GPS satellites are visible at a second segment of the route, a value of "2" may be assigned to the second segment of the route. The reliability rating for the route can be calculated by summing the values assigned to each segment of the route to yield a reliability rating of "6" for the route. Alternately, the reliability rating can be calculated by calculating an average of the values assigned to each segment of the route to yield a reliability rating of "3" for the route, based on the above example. It is noted that, for simplicity, the above example only considers the satellite visibility as a visibility metric in calculating the reliability rating. However, multiple visibility metrics (e.g., dilution of precision, multipath, etc.) can be considered in calculating the reliability rating. Furthermore, because some visibility metrics may have a greater influence on the reliability of the route as compared to other visibility metrics, the visibility metrics may be weighted appropriately. In other words, the reliability rating for the route may be calculated as a weighted combination of the visibility metrics associated each segment of the route. In some implementations, reliability ratings for each segment of the route can be calculated and the reliability rating of the route can be calculated as an aggregate (or an average) of the reliability ratings for the segments of the route. The flow continues at block 220.

At block 220, it is determined whether additional routes between the source location and the destination location are to be analyzed. If the routing unit 104 determines that additional routes between the source location and the destination location are to be analyzed, the flow loops back to block 206 in FIG. 2, where a next route is identified and operations described with reference to blocks 208-220 are executed for the next route to determine the reliability rating for the next route. Otherwise, the flow continues at block 222.

At block 222, the reliability ratings for each of the one or more routes are compared and a route between the source location and the destination location with the best reliability rating is identified. For example, the routing unit 104 compares the reliability ratings for each of the routes to identify the route with the best reliability rating as the most reliable route. The flow continues at block 224.

At block 224, the identified route with the best reliability rating is presented on the user navigation device. For example, the routing unit 104 presents the most reliable route on a display unit of the user navigation device 102. From block 224, the flow ends.

It is noted that in some implementations, the user may have an option of configuring a reliability threshold to indicate a lowest tolerable reliability rating. For example, if a reliability rating of "1" represents a least reliable route and a reliability rating of "10" represents a most reliable route, the user may configure a reliability threshold (e.g., a reliability threshold of "6") to indicate the lowest tolerable reliability rating. The routing unit 104 may discard all routes that fall below the reliability threshold. If none of the routes between the source location and the destination location meet the reliability threshold, the routing unit 104 can present a notification that it is not possible to identify a reliable route between the source location and the destination location. Alternately, the routing unit 104 can present the most reliable route irrespective of whether it meets the reliability threshold.

Although not depicted in FIGS. 2-3, in some implementations, operations for determining a most reliable route as described herein can be combined (e.g., as a weighted combination) with other traditional means of routing. For example, a route that is jointly optimized for the shortest distance between the source location and the destination location and the best satellite visibility and quality of navigation may be determined. As another example, the routing unit 104 may select a route to optimize reliability of the route and another routing constraint such as least route travel time between the source location and the destination location. In one implementation, the routing unit 104 may select a route to simultaneously optimize all the routing constraints selected by the user. For example, the routing unit 104 may select a route such that the reliability rating of the route is better than the reliability threshold and the route travel time is less than a threshold time. If such a route cannot be determined, the routing unit 104 may present multiple routes—each of which satisfy individual routing constraints. The routing unit 104 may present a first route with the best reliability rating and indicate the route travel time. The routing unit 104 may present a second route with the shortest route travel time and may indicate the reliability rating of the second route. The routing unit 104 may prompt the user to select a desired route. In some implementations, the routing unit 104 may also provide reasons for low reliability rating of the second route (e.g., indicate regions of poor satellite visibility, high multipath, etc.) to enable the user to make an informed decision in selecting between the most reliable route with a high route travel time and a less reliable route with a least route travel time.

In some implementations, the user may input a source location and a destination location, and the routing unit 104 may identify multiple routes between the source location and the destination location. After the multiple routes are determined, the user can indicate (e.g., on a user interface of the user navigation device 102) one or more requisite routing options. The routing unit 104 can rank and order the routes based on the routing options and the rank assigned to each of the routes. For example, the user may indicate that routes are to be ranked in order of best reliability and shortest distance. The routing unit 104 may display the multiple identified routes along with the estimated distance to be traversed along each of the multiple routes and a reliability rating associated with each of the multiple routes. After the user selects one of the displayed routes, the routing unit 104 can map the selected route and display directions to the destination location via the selected route.

Figure 4:
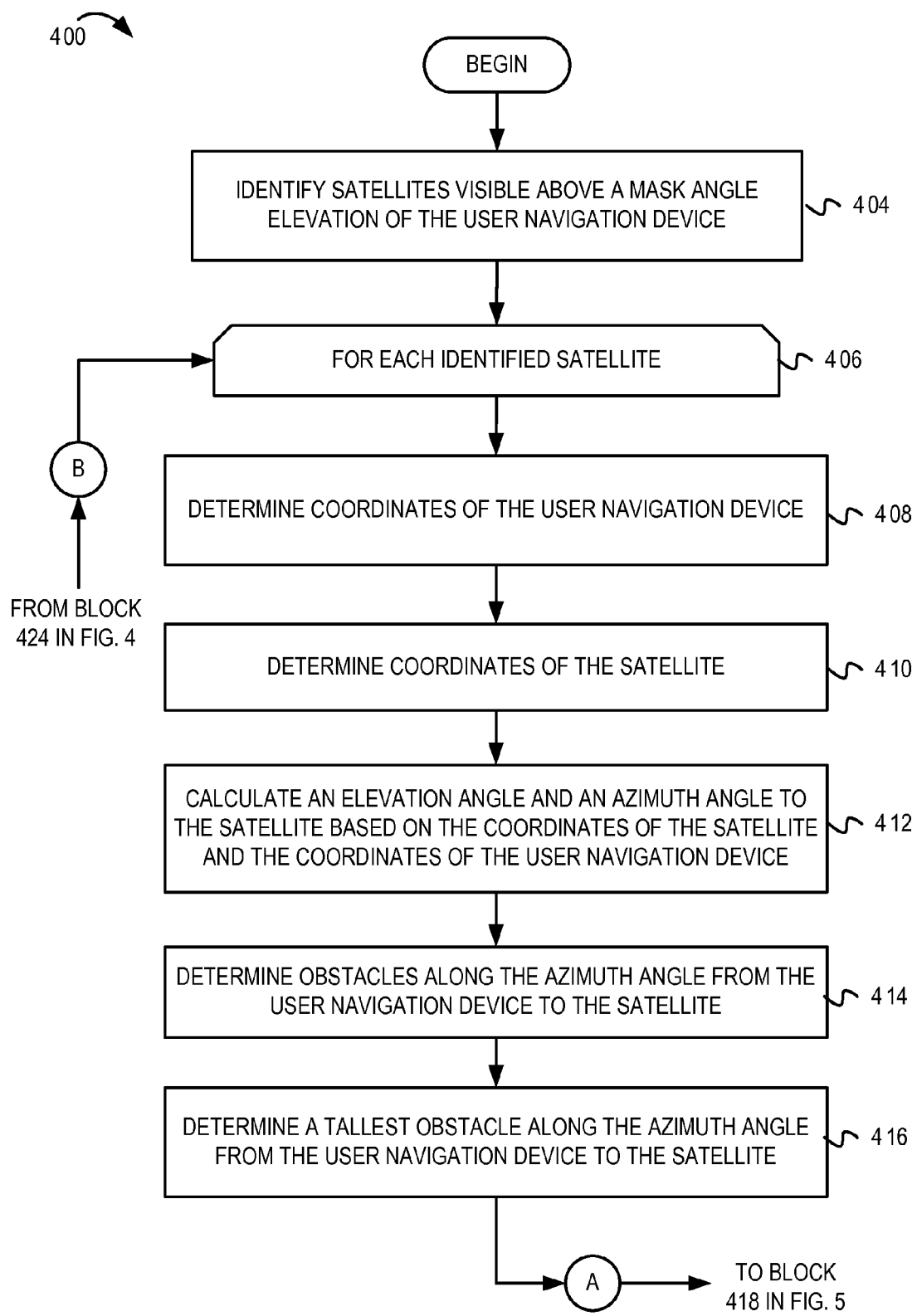
FIG. 4 is a flow diagram illustrating example operations for determining navigation satellite availability.
Figure 5:
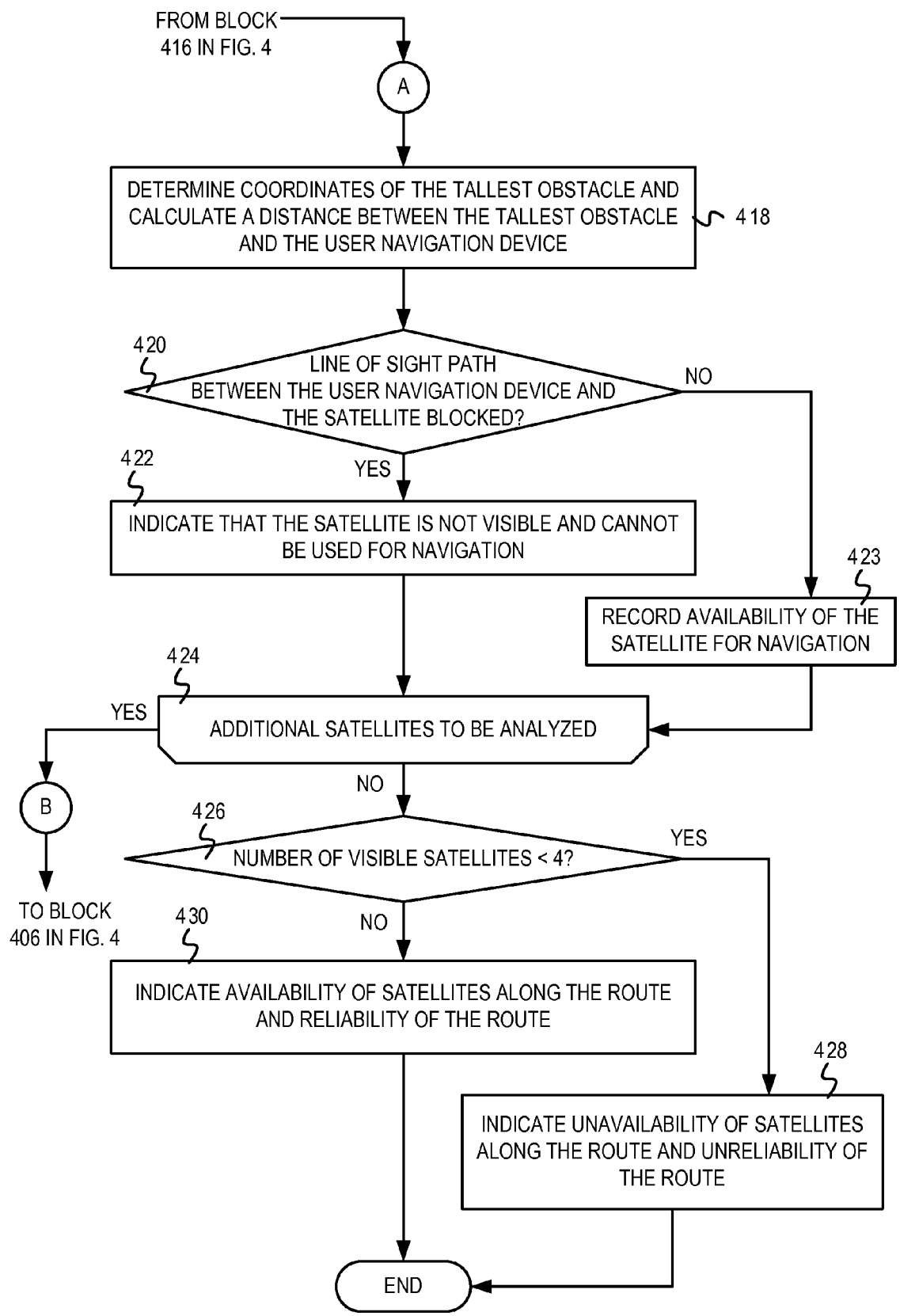
FIG. 5 is a continuation of FIG. 4 and is a flow diagram illustrating example operations for determining navigation satellite availability.

FIG. 4 and FIG. 5 depict a flow diagram 400 illustrating example operations for determining navigation satellite availability. The flow 400 begins at block 404 in FIG. 4.

At block 404, GPS satellites visible above a mask angle elevation of a user navigation device are identified. For example, the route reliability calculation unit 108 of FIG. 1 can identify the GPS satellites visible above the mask angle elevation of the user navigation device 102. Satellite availability can represent a number of GPS satellites at a given location of the user navigation device 102 that are visible at or above a predefined mask angle from the user navigation device 102. To minimize effects of the environment, GPS satellite geometry, etc., a minimum elevation with respect to the horizon below which GPS satellite signals will not be used (also known as the mask angle) can be defined. For example, the mask angle of the user navigation device 102 may be set to 5 degrees above the horizon. Thus, any GPS satellites with an elevation angle less than 5 degrees may not be taken into consideration when determining the number of visible satellites or when determining routing directions. Typically, in clear sky conditions (e.g., no obstacles in the line of sight path), the user navigation device 102 may receive GPS signals from 8-12 GPS satellites with at least a threshold received signal strength for effective acquisition and tracking. However, GPS satellite visibility may be reduced when the user navigation device 102 is surrounded by tall buildings or other obstacles (e.g., in an urban canyon). Therefore, the user navigation device 102 may be limited to using GPS satellites directly overhead or along a narrow visibility corridor (e.g., in between buildings). In some implementations, the satellite visibility may drop to less than 4 satellites leading to interruptions in navigation service. The flow continues at block 406.

At block 406, a loop begins for each identified GPS satellite visible above the mask angle elevation of the user navigation device. For example, the route reliability calculation unit 108 can execute operations described with reference to blocks 408-422 for each identified GPS satellite visible above the mask angle elevation of the user navigation device 102. The route reliability calculation unit 108 can execute operations described in the flow 400 at multiple sample points along a route for determining satellite visibility at the sample points. In one implementation, if the path of the GPS satellites is known (e.g., based on ephemeris and almanac), the GPS satellite 114 visible above the mask angle elevation of the user navigation device 102 at the time of day when the user navigation device 102 is expected to reach a particular sample point can be predetermined, as will be described further below. The flow continues at block 408.

At block 408, coordinates of the user navigation device are determined. For example, the route reliability calculation unit 108 can determine the coordinates of the user navigation device 102. The latitude ($\omega$) and longitude ($\lambda$) of the user navigation device 102 at time t can be determined by accessing a map database on the user navigation device 102. The time t can be calculated as the time instant at which the user navigation device 102 is expected to be at the sample point travelling at a known speed (e.g., taking speed limits of the roads into consideration). The corresponding Earth-Centered, Earth-Fixed (ECEF) coordinates of the user navigation device 102 can be represented as $(X_v, Y_v, Z_v)$. In some implementations, the coordinates of the user navigation device 102 can be determined in terms of latitudes and longitudes, UTM coordinates, or geospatial coordinates. The flow continues at block 410.

At block 410, coordinates of the satellite are determined. For example, the route reliability calculation unit 108 can determine the coordinates of the GPS satellite 114 visible above the mask angle elevation of the user navigation device 102. The route reliability calculation unit 108 can determine, based on the ephemeris, the ECEF coordinates for the GPS satellite $(X_s, Y_s, Z_s)$ visible from the user navigation device 102 at device co-ordinates $(X_v, Y_v, Z_v)$ at time instant t. It is noted that the coordinates of the GPS satellite 114 can be calculated using the ephemeris as long as the ephemeris is valid. Once the ephemeris is no longer valid, the coordinates of the GPS satellite 114 can be determined based on the almanac or network-based extended ephemeris. Prediction algorithms (e.g., Atheros® Ephemeris Self-Prediction (ESP)™ algorithms) may also be used to generate the ephemeris of the GPS satellite 114 and to predict the coordinates of the GPS satellite 114. The flow continues at block 412.

At block 412, an elevation angle and an azimuth angle to the satellite are calculated based on the coordinates of the satellite and the coordinates of the user navigation device. For example, the route reliability calculation unit 108 can calculate the elevation angle and the azimuth angle to the GPS satellite 114 based on the coordinates of the GPS satellite 114 and the coordinates of the user navigation device 102. The azimuth angle and the elevation angle are angular measurements that are typically used for navigation and mapping. The azimuth angle and the elevation angle from the user navigation device 102 to the GPS satellite 114 can be computed based on an East, North, Up (ENU) coordinate system. The ENU coordinate system rotates with an observer on Earth and is oriented such that the N-axis points due north from the observer, the E-axis points east from the observer, and the U-axis points radially outward. The azimuth angle can be measured clockwise from the N-axis and can span 0 to 360 degrees. The elevation angle can be measured from the horizon to the navigation satellite and can span −90 to 90 degrees. To compute the azimuth angle and the elevation angle, a difference vector ($\Delta x$) between the co-ordinates of the GPS satellite 114 and the coordinates of the user navigation device 102 is calculated as depicted in Eq. 1.

$$\Delta x = [dx\ dy\ dz] = [X_s Y_s Z_s] - [X_v Y_v Z_v] \quad \text{Eq. 1}$$

ENU components of a vector from the user navigation device 102 to the GPS satellite 114 are computed as depicted in Eq. 2

$$\begin{bmatrix} E \\ N \\ U \end{bmatrix} = \begin{bmatrix} -\sin\lambda & -\cos\lambda & 0 \\ -\sin\varphi\cdot\cos\lambda & -\sin\varphi\cdot\sin\lambda & \cos\varphi \\ \cos\varphi\cdot\cos\lambda & \cos\varphi\cdot\sin\lambda & \sin\varphi \end{bmatrix} [\Delta x] \quad \text{Eq. 2}$$

The elevation angle $E_l$ and the azimuth angle $A_z$ are calculated as depicted in Eq. 3 and Eq. 4, respectively. The flow continues at block 414.

$$E_l = \tan\left(2\frac{U}{\sqrt{E^2 + N^2}}\right) \quad \text{Eq. 3}$$

$$A_z = \tan\left(2\frac{E}{N}\right) \quad \text{Eq. 4}$$

At block 414, obstacles along the azimuth angle from the user navigation device to the GPS satellite are determined. For example, the route reliability calculation unit 108 can identify the obstacles along the azimuth angle from the user navigation device 102 to the GPS satellite 114. In one example, obstacles that are less than a predetermined horizontal distance (e.g., 5 km) from the user navigation device 102 may be determined. The predetermined horizontal distance may be determined based on the mask angle and an estimated maximum height of the obstacles. For example, if the maximum height ($h_{max}$) of the obstacles is assumed to be 450 meters and if the mask angle ($\theta_m$) is set to 5 degrees, the predetermined horizontal distance (D) can be calculated, based on Eq. 5, to be approximately 5 km. The user navigation device 102 can store three-dimensional maps that indicate altitudes of buildings, other man-made structures, natural features (e.g., mountains), and other obstacles that could impede a line of sight path to the GPS satellite 114. In another example, the user navigation device 102 can access a remote server (not shown) such as a Google® elevation services server, to determine the altitudes of buildings, other man-made structures, natural features (e.g., mountains), and other obstacles that could impede a line of sight path to the GPS satellite 114. The flow continues at block 416.

$$D = \frac{h_{max}}{\tan\theta_m} \quad \text{Eq. 5}$$

At block 416, a tallest obstacle along the azimuth angle from the user navigation device to the GPS satellite is determined. For example, the route reliability calculation unit 108 can determine the tallest obstacle along the azimuth angle from the user navigation device 102 to the GPS satellite 114. In one example, Google Maps™ elevation feature may be used to determine an elevation profile of the obstacles. The flow continues at block 418 in FIG. 5.

At block 418, coordinates of the tallest obstacle are determined and a distance between the tallest obstacle and the user navigation device 102 is calculated. For example, the route reliability calculation unit 108 can determine the coordinates of the tallest obstacle and can calculate the distance between the tallest obstacle and the user navigation device 102. Based on the position of the obstacles (as determined from the three-dimensional database) and the orientation of the obstacle with respect to the user navigation device 102, the shortest distance between the user navigation device 102 and the tallest obstacle can be calculated. Refraction of the line of sight GPS signal from the GPS satellite 114 to the user navigation device 102 and bending of the GPS signal around the obstacles may or may not be taken into consideration. The flow continues at block 420.

At block 420, it is determined whether a line of sight path between the user navigation device and the GPS satellite is blocked. For example, the route reliability calculation unit 108 can determine whether the line of sight path between the user navigation device 102 and the GPS satellite 114 is blocked. For this, the altitude at which a line of sight vector from the GPS satellite 114 intersects the tallest obstacle is computed and is compared against a true height of the tallest obstacle as depicted in Eq. 6. In Eq. 6, h is the height of the tallest obstacle, D is the predetermined horizontal distance calculated in Eq. 5, and $E_l$ is the elevation angle calculated in Eq. 3.

$$D\cdot\tan(E_l) \leq h \quad \text{Eq. 6}$$

If the expression of Eq. 6 is satisfied, the route reliability calculation unit 108 determines that the line of sight vector between the tallest obstacle and the user navigation device passes through the tallest obstacle. Therefore, it is assumed that the GPS signal from the GPS satellite 114 will be too weak when it is received at the user navigation device 102 to enable proper acquisition and decoding of the received GPS signal. Consequently, the GPS satellite 114 is considered to be unavailable. If it is determined that the line of sight path between the user navigation device 102 and the GPS satellite 114 is blocked, the flow continues at block 422. Otherwise, the flow continues at block 424.

At block 422, the GPS satellite is deemed to not be visible. For example, on determining that the line of sight path between the user navigation device 102 and the GPS satellite 114 is blocked, the route reliability calculation unit 108 can deem the GPS satellite 114 to not be visible. Consequently, the GPS satellite can be removed from a visible satellite list. The route reliability calculation unit 108 can also indicate that the GPS satellite 114 cannot be used for determining routing directions along the route. The flow continues at block 423.

At block 423, availability of the satellite for navigation is recorded. For example, the route reliability calculation unit 108 can determine that the GPS satellite that was analyzed is available and can be used for navigation. The route reliability calculation unit 108 can also record availability of the GPS satellite in a local structure. The flow continues at block 424.

At block 424, it is determined whether additional GPS satellites visible above the mask angle of the user navigation device are to be analyzed. For example, the route reliability calculation unit 108 determines whether additional GPS satellites visible above the mask angle of the user navigation device 102 are to be analyzed. The flow 400 moves from block 423 to block 424 if the route reliability calculation unit 108 determines that the line of sight path between the user navigation device 102 and the GPS satellite 114 is not blocked. The flow 400 also moves from block 422 to block 424 if the route reliability calculation unit 108 determines that the line of sight path between the user navigation device 102 and the GPS satellite 114 is blocked and indicates that the GPS satellite 114 cannot be used for navigation. If it is determined that additional GPS satellites are to be analyzed, the flow loops back to block 406 in FIG. 4, where a next GPS satellite visible above the mask angle of the user navigation device 102 is identified and operations described with reference to block 408-422 are executed for the next GPS satellite. Otherwise, the flow continues at block 426.

At block 426, it is determined whether the number of GPS satellites visible at the user navigation device is less than four. For example, the route reliability calculation unit 108 can determine whether the number of GPS satellites visible at the user navigation device 102 is less than four. The number of visible GPS satellites being less than four can indicate that location estimation and consequently route estimation cannot be performed at the sample point. In some implementations, another sample point can be identified and analyzed. If it is determined that the number of GPS satellites visible at the user navigation device 102 is less than four, the flow continues at block 428. Otherwise, the flow continues at block 430.

At block 428, it is determined that the route is unreliable. For example, the route reliability calculation unit 108 can indicate that the route is unreliable based on determining that less than four GPS satellites are visible along the route. The communication unit 106 of the user navigation device 102 may communicate visibility metrics associated with the route such as elevation and azimuth angles, identified GPS satellites above the mask angle, GPS satellites that are not visible, etc. to the location server 110. In some implementations, the route reliability calculation unit 108 can also store the visibility metrics associated with the route in a local reliability database. Based on the visibility metrics, the route reliability calculation unit 108 can calculate a reliability rating of the route. The route reliability calculation unit 108 may assign a poor reliability rating to the route because less than four GPS satellites are visible along the route. The reliability rating may be stored on the user navigation device 102 and/or may be communicated to the location server 110. As described above in FIGS. 1-3, the routing unit 104 can use the reliability rating to select an appropriate reliable route for presentation by the user navigation device 102. From block 428, the flow ends.

At block 430, it is determined that the route is reliable. For example, the route reliability calculation unit 108 can indicate that the route is reliable based on determining that at least four GPS satellites are visible along the route. As described above, the visibility metrics associated with the route may be communicated to the location server 110 and/or may be stored on the user navigation device 102. Based on the visibility metrics, the route reliability calculation unit 108 can also calculate a reliability rating of the route. The route reliability calculation unit 108 may assign a better reliability rating to the route because four or more GPS satellites are visible along the route. From block 430, the flow ends.

As described above, block 426 of FIG. 5 depicts the route reliability calculation unit 108 determining whether the number of visible satellites is less than four. However, if a vertical position (e.g., a height or elevation information) of the user navigation device 102 is not required, three navigation satellites may be sufficient to determine a horizontal position of the user navigation device 102 and route the user navigation device 102 along a horizontal plane. Consequently, the route reliability calculation unit 108 may determine whether the number of navigation satellites visible at the user navigation device is less than three and the route may be deemed to be unreliable if the number of navigation satellites visible at the user navigation device is less than three.

It is noted that although FIGS. 4-5 describe operations for analyzing a route to determine satellite visibility along the route, embodiments are not so limited. In some implementations, the route can be divided into multiple segments and satellite visibility for each segment of the route can be determined. In another implementation, multiple sample points along the route can be determined and satellite visibility at each sample point of the route can be determined. The route can be deemed to be reliable if four or more GPS satellites are visible in at least a threshold number of continuous segments (or sample points). Furthermore, in some implementations, the operations of FIGS. 4-5 can be executed as part of operations for determining the most reliable route between the source location and the destination location, as described with reference to FIG. 2. In other implementations, the operations of FIGS. 4-5 can be executed on-the-fly as the user traverses a particular route.

It is noted that although FIGS. 4-5 describe operations for identifying the tallest obstacle and determining whether the tallest obstacle occludes the line of sight path between the user navigation device 102 and the GPS satellites above the mask angle, embodiments are not so limited. In other embodiments, at multiple sample points along the route, for every GPS satellite that is visible above the mask angle from the user navigation device 102 (and at the time of day when the user navigation device 102 is expected to be at the sample point), the azimuth angle of the GPS satellites can be compared against the azimuth angle of obstacles in the vicinity of the sample point. If there is an obstacle along a vector from the user navigation device 102 to the GPS satellite, and if the altitude of the obstacle is such that the obstacle occludes a direct line of sight path from the GPS satellite to the user navigation device 102, it may be determined that the user navigation device 102 may encounter challenges in acquiring and decoding GPS signals from that GPS satellite.

In some embodiments, an electronic device may not comprise navigation capabilities (i.e., may not have the ability to receive GPS signals from GPS satellites or navigation capabilities of the electronic device may be temporarily unavailable) but may instead have wireless communication (e.g., WLAN) capabilities. In such embodiments, routing between a source location and a destination location may be based on maximizing the availability and quality of WLAN access points, as will be described in FIG. 6.

Figure 6:
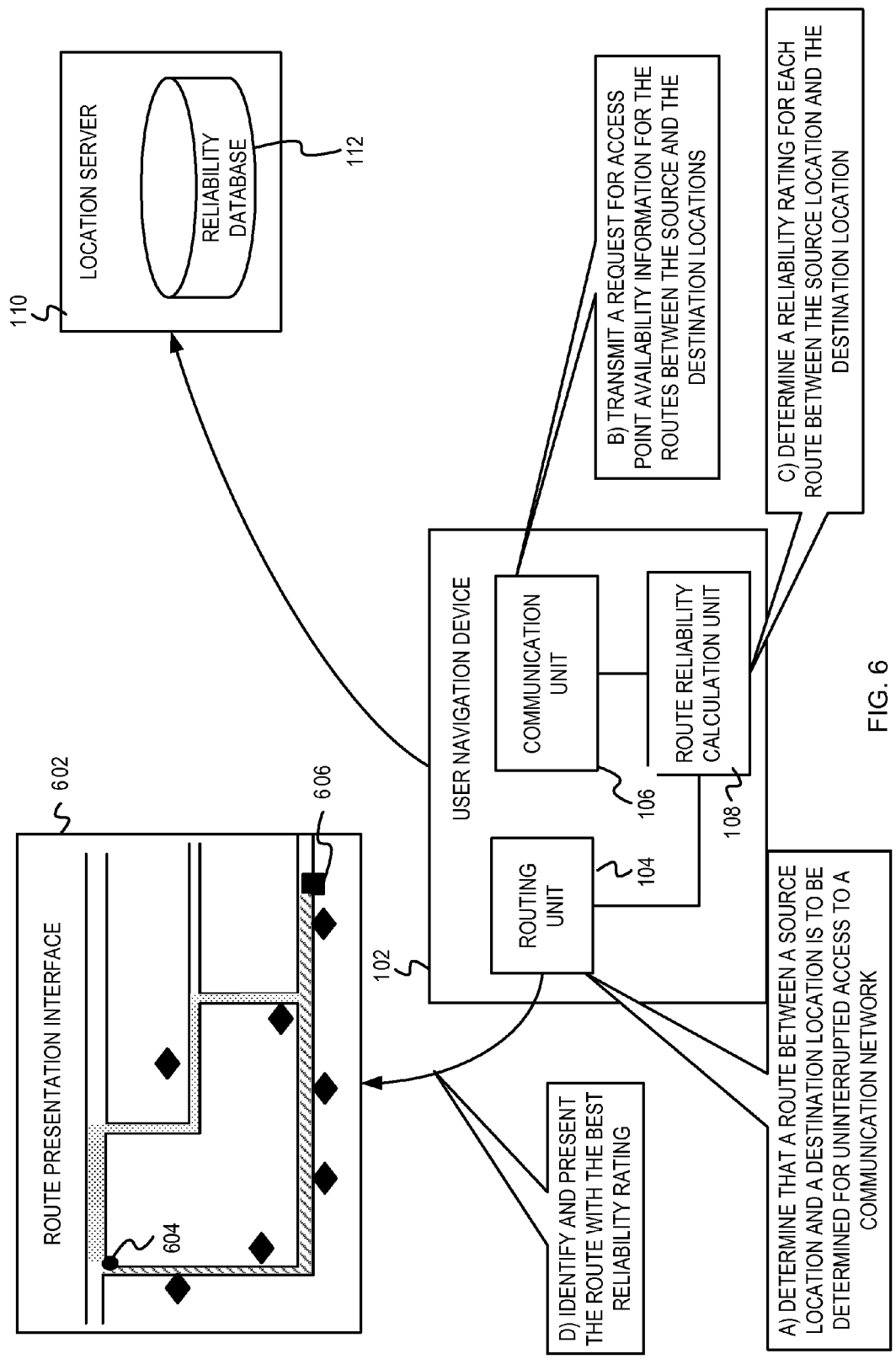
FIG. 6 is an example block diagram illustrating example operations for determining a route for uninterrupted WLAN connectivity.

FIG. 6 is an example block diagram illustrating example operations for determining a route for uninterrupted WLAN connectivity. FIG. 6 depicts the user navigation device 102 comprising the routing unit 104, the communication unit 106, and the route reliability calculation unit 108. The user navigation device 102 communicates with the location server 110. The location server 110 comprises the reliability database 112. The user navigation device 102 operates in conjunction with the location server 110 to determine a route for uninterrupted WLAN connectivity as will be described in stages A-D.

At stage A, the routing unit 104 determines that a route between a source location and a destination location is to be determined for uninterrupted access to a communication network. The routing unit 104 can implement any suitable routing algorithm (e.g., vector-based routing) and can access cartographic maps and/or a map database to determine one or more routes between the source location and the destination location. As depicted by the route presentation interface 602, the routing unit 104 identifies two routes between the source location 604 and the destination location 606. The first route is depicted using hatched lines while the second route is depicted using dots.

At stage B, the communication unit 106 transmits a request for access point availability information for the routes between the source location 604 and the destination location 606. In one implementation, the communication unit 106 may provide the source location 604 and the destination location 606 to the location server 110. The location server 110 may determine one or more routes between the source location 604 and the destination location 606, access the reliability database 112, and provide locations of access points (e.g., WLAN hotspots) along the routes. In another implementation, the communication unit 106 may provide the one or more routes determined at stage A to the location server 110, and location server 110 can provide the location of the access points to the communication unit 106. In response to receiving the locations of the access points, the routing unit 104 can determine the location of the access points with reference to the source location 604, the destination location 606, and the one or more routes. Additionally, the location server 110 can also access the reliability database 112 and determine visibility metrics associated with each of the access points. As described above, the reliability database 112 can comprise visibility metrics associated with routes, segments of a route, one or more sample points along a route, etc. The visibility metrics can indicate access point availability and estimates of quality of WLAN signals received from available access points (e.g., whether received WLAN signals are likely to be affected by multipath, attenuation, etc.). The visibility metrics can indicate a number of access points available along the route, whether the access points are well distributed along the route (e.g., whether access points are available for each segment of the route), distance between the access point and the route (e.g., to determine strength of the WLAN signal on the route), multipath, whether the access point requires additional authentication (e.g., a username and a password), whether the access point enables paid WLAN access (e.g., whether the user has to pay before being granted WLAN access), etc.

At stage C, the route reliability calculation unit 108 determines a reliability rating for each route between the source location 604 and the destination location 606. The reliability rating, for each route, can be determined based on the visibility metrics associated with the route or associated with each segment of the route. The reliability rating for the route may be calculated as a weighted combination (e.g., a weighted sum or a weighted average) of the visibility metrics associated with the route (or with each segment of the route). The reliability rating for the route can indicate the ability of the user navigation device 102 to continuously maintain WLAN connectivity while traversing the route. For example, a high reliability rating for the route may indicate that a sufficient number of reliable access points are available on the route and that the route can be traversed without losing WLAN connectivity. In FIG. 6, the route represented by the hatched lines passes through six well-distributed access points. Therefore, the route may be assigned a high reliability rating. However, the route represented by the dots passes only through two access points. Moreover, various segments of the route are not serviced by access points and may not have WLAN connectivity. Therefore, the route may be assigned a poor reliability rating. In some implementations, the communication unit 106 can communicate the calculated reliability ratings to the location server 110.

At stage D, the routing unit 104 identifies and presents the route with the best reliability rating. In FIG. 6, the routing unit 104 selects the route represented by the hatched lines because the route has a better reliability rating and has a high probability of providing uninterrupted WLAN connectivity along the route. The routing unit 104 can update the route presentation interface 602 to present the most reliable route and to guide the user from the source location to the destination location while avoiding areas with blind spots (i.e., areas that do not have WLAN access). In another embodiment, the routing unit 104 can determine multiple routes between the source location and the destination location. The routing unit 104 can rank the routes based on the reliability rating of the routes and can prompt the user to select the desired route. In some implementations, the user can indicate that other routing options (e.g., least estimated travel time, number of miles between the source location and the destination location, etc.) in addition to the reliability rating of the routes are to be taken into consideration. The routing unit 104 can rank the routes taking all the requisite routing options into consideration and can prompt the user to select the desired route. For example, as described above, the user may indicate that the route between the source location and the destination location should be determined based on reliability of WLAN connectivity and based on a shortest estimated travel time. The routing unit 104 can present multiple routes on the route presentation interface 602 with a corresponding reliability rating and an estimated travel time for each of the routes. After the user selects one of the routes, the routing unit 104 can route the user along the selected route.

It is noted that although FIG. 6 describes the access points being legacy access points where the locations of the access points are stored at the location server 110, embodiments are not so limited. In other embodiments, the access points may be positioning-capable access points that can transmit their location coordinates and permit timing measurements at or from the user navigation device 102 that supports WLAN communication. Furthermore, although FIG. 6 describes operations for maintaining WLAN connectivity to ensure that routing directions can be continuously provided as the user traverses the route, embodiments are not so limited. In other implementations, the operations of FIG. 6 can be extended for enabling connectivity for providing uninterrupted Internet access (e.g., to send/receive email messages, to communicate using a voice over Internet Protocol (VOIP) phone, etc.)

In some implementations, the user navigation device 102 may comprise both satellite navigation capabilities and WLAN communication capabilities. In such implementations, the user navigation device 102 may be capable of hybrid positioning and routing using both GPS networks and WLAN networks depending on availability of either of the networks. For example, in a clear sky environment, a clear line of sight path between the user navigation unit 102 and at least four GPS satellites may be obtainable. Thus, the routing unit 104 can use GPS positioning to determine the route between the source location and the destination location. However, in a city (or an urban canyon), a clear line of sight path may not be obtainable between the user navigation unit 102 and at least four GPS satellites, but uninterrupted WLAN connectivity may be available. Thus, the routing unit 104 can use WLAN positioning to determine the route between the source location and the destination location. Operations for hybrid positioning and routing using both GPS networks and WLAN networks is described further below in FIG. 7.

Figure 7:
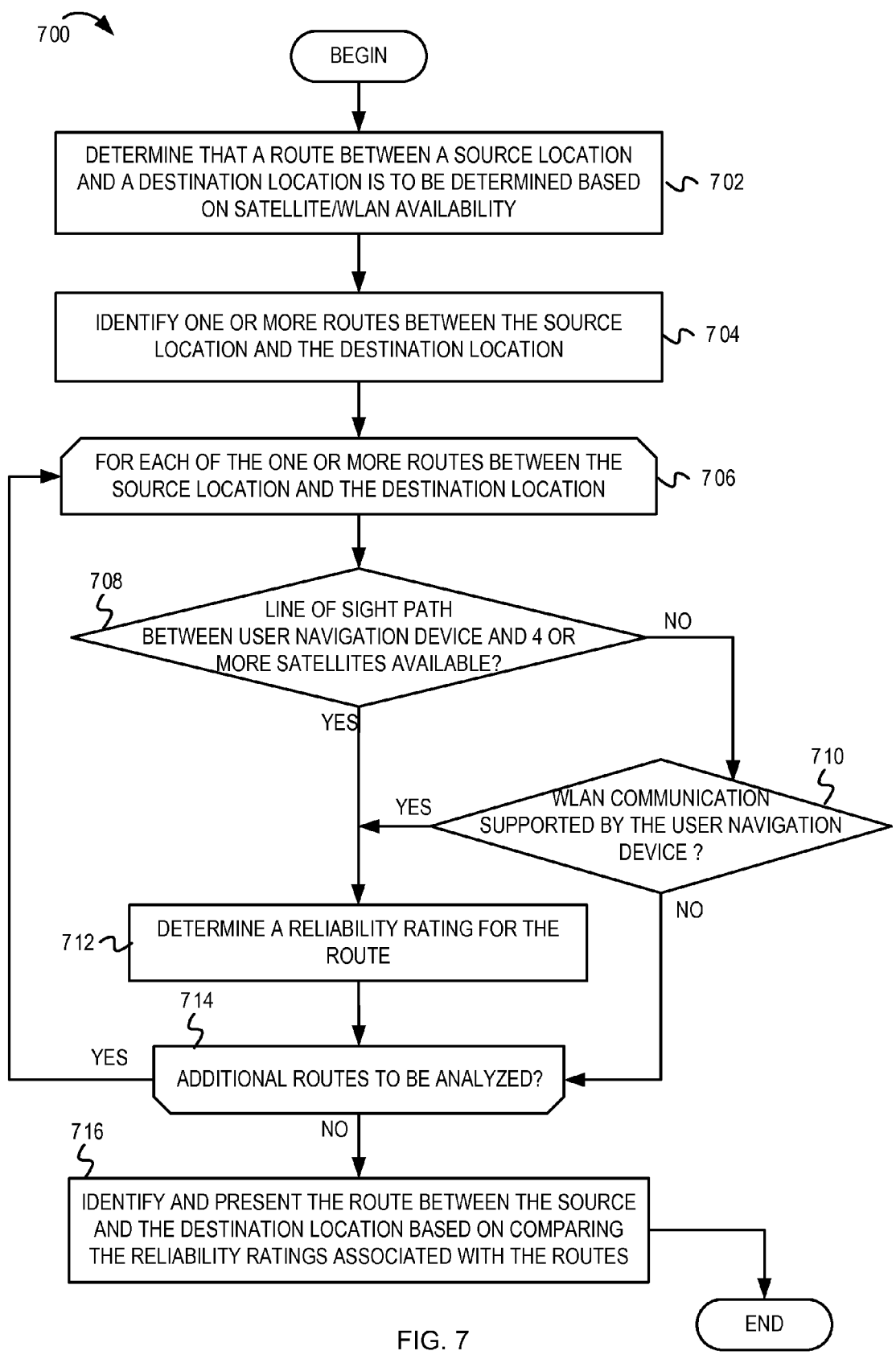
FIG. 7 is a flow diagram illustrating example operations for a hybrid routing system based on navigation satellite availability and WLAN connectivity.

FIG. 7 is a flow diagram 700 illustrating example operations for a hybrid routing system based on navigation satellite availability and WLAN connectivity. The flow 700 begins at block 702.

At block 702, it is determined that a route between a source location and a destination location is to be determined based on satellite/WLAN availability. For example, the routing unit 104 of FIG. 1 can determine that a route between the source location and the destination location is to be determined based on satellite/WLAN availability. In some implementations, the routing unit 104 can determine that a most reliable route between the source location and the destination location is to be presented. The routing unit 104 can determine whether the user navigation device 102 comprises a GPS receiver and whether the user navigation device 102 supports wireless communication. If so, the routing unit 104 can determine the most reliable route based on the availability of GPS satellites or based on the availability of access points, as will be described below. The flow continues at block 704.

At block 704, one or more routes between the source location and the destination location are identified. As described above, with reference to block 202 of FIG. 2, the routing unit 104 can implement any suitable routing algorithm (e.g., vector-based routing), access cartographic maps, and/or access a map database to determine the one or more routes between the source location and the destination location. The flow continues at block 706.

At block 706, a loop begins for each of the one or more routes between the source location and the destination location. For example, the routing unit 104 can execute operations described with reference to blocks 708-714 for each of the one or more routes between the source location and the destination location. The flow continues at block 708.

At block 708, it is determined whether a line of sight path between the user navigation device and four or more GPS satellites is available. For example, the routing unit 104 can determine whether a line of sight path between the user navigation device 102 and four or more GPS satellites is available. The route reliability calculation unit 108 of FIG. 1 can execute operations described with reference to FIG. 5 to determine whether four or more GPS satellites are visible along the route.

Each sample point along the route can be analyzed to determine whether a line of sight path to at least four GPS satellites is available at the user navigation device 102. In one implementation, it may be determined whether four or more GPS satellites are visible along each segment (or at each sample point) of the route. In another implementation, it may be determined whether four or more GPS satellites are visible along at least a threshold number of segments (or a threshold number of sample points) of along the route. If the line of sight path to at least four GPS satellites cannot be determined at the threshold number of consecutive sample points along the route, the route can be deemed to be unreliable and can either be assigned a poor reliability rating or be discarded. If is determined that a line of sight path between the user navigation device 102 and four or more GPS satellites is available, the flow continues at block 712. Otherwise, the flow continues at block 710.

At block 710, it is determined whether the user navigation device supports WLAN communication. The flow 700 moves from block 708 to block 710 on determining that a line of sight path between the user navigation device 102 and four or more GPS satellites is not available. For example, the route reliability calculation unit 108 can determine whether the user navigation device 102 supports WLAN communication. In one implementation, based on knowledge of communication protocols supported at the user navigation device 102, the route reliability calculation unit 108 can determine whether the user navigation device 102 supports WLAN communication protocols. In another implementation, the route reliability calculation unit 108 can query the communication unit 108 to determine whether the communication unit 108 can establish a wireless communication link with one or more access points. If it is determined that the user navigation device 102 supports WLAN communication, the flow continues at block 712. Otherwise, the flow continues at block 714.

At block 712, a reliability rating for the route is determined. For example, the route reliability calculation unit 108 can determine the reliability rating for the route. The flow 700 moves from block 708 to block 712 on determining that a line of sight path between the user navigation device 102 and four or more GPS satellites is available. The route reliability calculation unit 108 can access satellite visibility metrics from a data structure implemented on the user navigation device 102 (or can access the location server 110 to retrieve the satellite visibility metrics) and can combine the satellite visibility metrics associated the route (e.g., each segment of the route, multiple sample points along the route, etc.) to determine a reliability rating for the route, as was described above with reference to FIGS. 1-5. The flow 700 also moves from block 710 to block 712 on determining that the user navigation device 102 supports WLAN communication when a line of sight path with four or more GPS satellites is not available. The route reliability calculation unit 108 can combine access point visibility metrics associated with the route (e.g., each segment of the route, multiple sample points along the route, etc.) to determine a reliability rating for the route, as was described above with reference to FIG. 6.

In some implementations, the route reliability calculation unit 108 can use both satellite visibility metrics and access point visibility metrics to determine a reliability rating of a single route. For example, a line of sight path from the user navigation device 102 to four or more GPS satellites may only be available along a first segment of the route. WLAN connectivity to access points may be available along subsequent segments of the route. The route reliability calculation unit 108 can combine satellite visibility metrics associated with the first segment of the route and access point visibility metrics associated with the subsequent segments of the route to determine a reliability rating for the route. The flow continues at block 714. It is noted that in some implementations, neither a line of sight path to the user navigation device nor WLAN connectivity may be available along a particular route. In such a case, the routing unit 104 can discard the route and the flow can proceed to block 714 to determine whether a next route is to be analyzed.

At block 714, it is determined whether additional routes between the source location and the destination location are to be analyzed. If the routing unit 104 determines that additional routes between the source location and the destination location are to be analyzed, the flow loops back to block 706, where a next route between the source location and the destination location is identified and operations described with reference to blocks 708-712 are executed for the next route. Otherwise, the flow continues at block 716.

At block 716, the route between the source and the destination location with the best reliability rating is identified based on comparing the reliability ratings for each of the identified routes. For example, the routing unit 104 can identify the route between the source and the destination location with the best reliability rating, as was described above with reference to FIGS. 1-6. The routing unit 104 can also present the identified route on the user navigation device 102. Furthermore, in some implementations, the routing unit 104 can present multiple routes and can prompt the user to select one of the routes. From block 716, the flow ends.

It should be understood that the depicted diagrams (FIGS. 1-7) are examples meant to aid in understanding embodiments and should not be used to limit embodiments or limit scope of the claims. Embodiments may perform additional operations, fewer operations, operations in a different order, operations in parallel, and some operations differently. For example, in some instances the user navigation device 102 may be unable to connect to the location server 110 (e.g., because the user navigation device 102 does not support WLAN communication, because of poor connectivity and unavailability of access points, etc.) and may not have access to the location server 110 or the reliability database 112. In these instances, the user navigation device 102 may be able to execute operations described herein for determining the most reliable route by storing, in memory, visibility metrics related to satellite availability, outages, satellite accuracy along routes that the user travels. The user navigation device 102 can build a local reliability database and can "learn" which areas, road, or sections of roads are to be avoided while determining future routes.

In some implementations, after the routing unit 104 selects and presents the most reliable route based on identifying the route with the best reliability rating, the route reliability calculation unit 108 can calculate visibility metrics for the selected route as the user traverses the route. For example, as the user travels along the selected route, the route reliability calculation unit 108 can determine satellite visibility, obstacles in the line of sight path of the satellites, and other information to determine the visibility metrics for each segment of the selected route. The route reliability calculation unit 108 may compare the calculated visibility metrics with the visibility metrics received from the location server 110. For example, the visibility metrics received from the location server 110 may indicate that four satellites are visible for a particular segment of the selected route. The route reliability calculation unit 108 may determine that only two satellites are visible for the same segment of the selected route. The route reliability calculation unit 108 may communicate any discrepancies in the visibility metrics to the location server 110 and may also store the calculated visibility metrics for subsequent use. Likewise, in FIG. 6, the route reliability calculation unit 108 can also determine access point availability information associated with the selected route as the user traverses the selected route. The route reliability calculation unit 108 can communicate the determined access point availability information to the location server 110.

Various configurations are possible with respect to where the visibility metrics (e.g., availability, satellite visibility, DOP) and other relevant information (e.g., 3D maps, WLAN locations, satellite almanacs, etc.) are stored and where routing operations described herein are executed. In some implementations, the visibility metrics and the other relevant information can be stored in a user navigation device hard drive and a host processor in the user navigation device 102 can execute the routing operations. In another implementation, the visibility metrics and the other relevant information can be stored on the location server 110 and the user navigation device 102 can communicate with the location server 110 via a wireless communication network interface to retrieve the requisite data. The host processor in the user navigation device 102 can execute the routing operations, as described with reference to FIGS. 1-7. In another implementation, the user navigation device 102 can store a map database and can access the location server 110 to retrieve the visibility metrics and other information that cannot be gleaned from the map database. The host processor in the user navigation device 102 can execute the routing operations for determining the route with the best reliability rating. In another implementation, the user navigation device 102 can transmit a request, to the location server 110, for a most reliable route between the source location and the destination location. The location server 110, in turn, can determine one or more routes between the source location and the destination location, determine a reliability rating for the routes, select the route with the best reliability rating, and communicate the selected route to the user navigation device 102. The user navigation device 102 can store a two-dimensional map database to facilitate re-routing if user makes an error or change routes. If the user navigation device 102 maintains a continuous connection with the location server 110 (e.g., via a wireless communication network, a cellular network, a data network, etc.), the location server 110 can track the location of the user navigation device 102 and can perform dynamic re-routing if the user deviates from a presented route.

Furthermore, the operations described herein for routing based on satellite visibility and reliability can also be extended to other routing and positioning systems, such as positioning in cellular network, a WiMAX network, etc. Instead of identifying a route based on availability of GPS satellites (as described in FIGS. 1-5) and on availability of WLAN access points (as described in FIG. 6), the route could be determined based on availability of cellular base stations or WiMAX base stations. Furthermore, other connection protocols that enable connection to the Internet or that facilitate exchange of information can be used to determine the most reliable route in accordance with operations described herein. In some implementations, a most reliable route between the source location and the destination location may be determined based on availability of multiple communication/positioning networks. For example, the most reliable route may be determined based on availability of navigation satellites and WLAN access points (as described in FIG. 7), based on availability of WLAN access points and cellular base stations, etc.

It is also noted that in some implementations, receiver autonomous integrity monitoring (RAIM) may be used, when high precision positioning is required, to assess the integrity of GPS signals received from GPS satellites along the routes. In accordance with RAIM, a faulty satellite pseudo-range (e.g., approximate distance between a satellite and the user navigation device) measurement that is inconsistent with the expected pseudo-range can be detected based on an estimated position of the user navigation device 102. For fault detection, RAIM can use a minimum of 5 GPS satellites with good geometry to be visible at the user navigation device 102. For fault detection and exclusion, RAIM can use a minimum of 6 GPS satellites to be visible at the user navigation device 102 so that a faulty GPS satellite can be detected and can be excluded when determining the position of the user navigation device 102.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
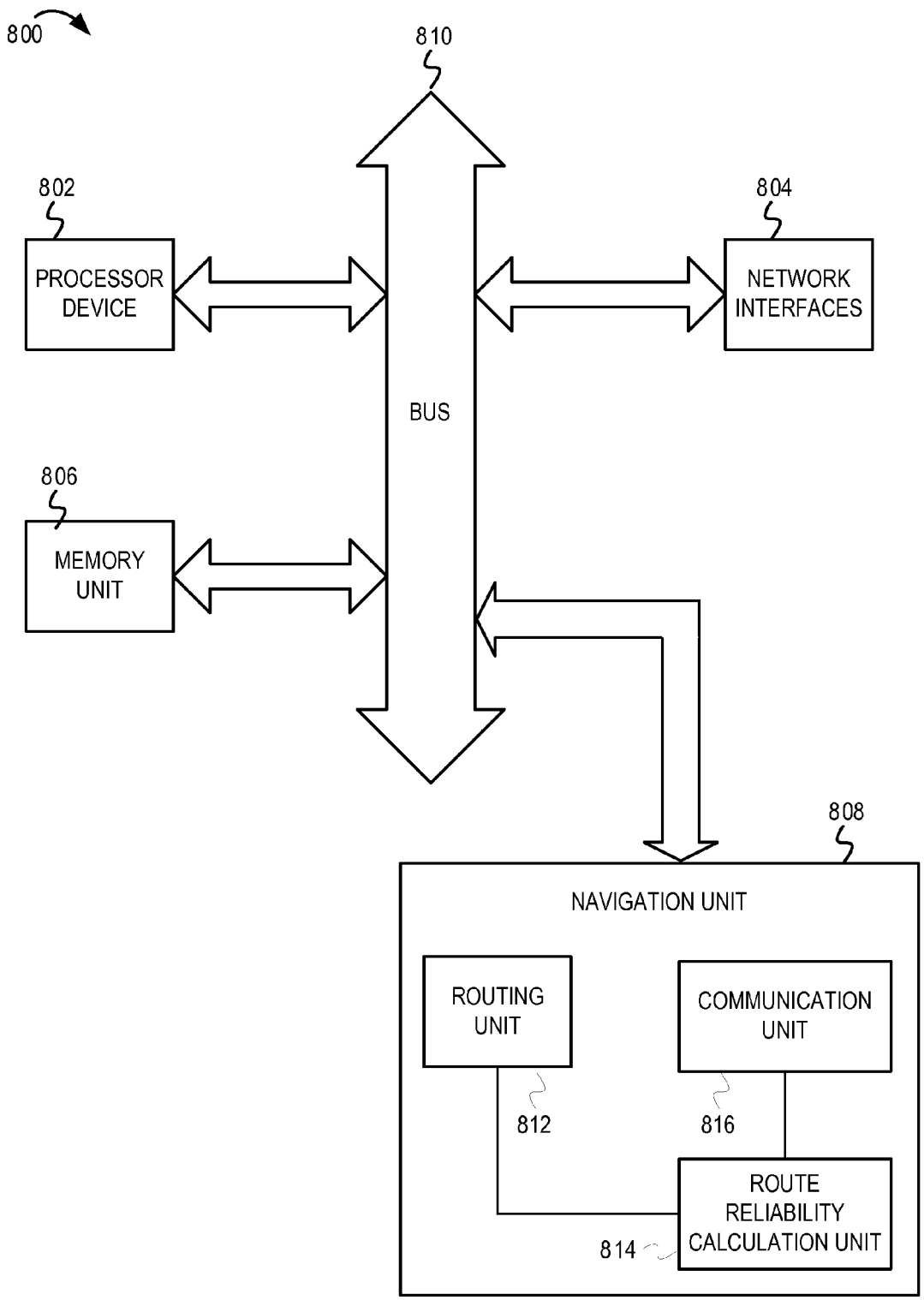
FIG. 8 is a block diagram of one embodiment of an electronic device including a mechanism for routing based on satellite and wireless network availability.

FIG. 8 is a block diagram of one embodiment of an electronic device 800 including a mechanism for routing based on satellite and wireless network availability. In some implementations, the electronic device 800 can be a dedicated user navigation device (e.g., a portable GPS system) configured to determine the location of the user navigation device and routing directions to a destination. In another implementation, the electronic device 800 may be any suitable electronic device such as a laptop, a netbook, a mobile phone, a personal digital assistant (PDA), a smartphone, or other portable electronic system which includes a navigation unit or a navigation module. The electronic device 800 includes a processor device 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, etc.), and network interfaces 804 that include at least one wireless network interface (e.g., a WLAN interface, a Bluetooth® interface, a WiMAX interface, a ZigBee® interface, a Wireless USB interface, etc.).

The electronic device 800 also includes a navigation unit 808. The navigation unit 808 comprises a routing unit 812, a communication unit 816, and a route reliability calculation unit 814. The navigation unit 808 executes operations described herein with reference to FIGS. 1-5 to determine a most reliable route between a source location and a destination location based on availability of navigation satellites. Alternately, the navigation unit 808 can also determine a most reliable route between the source location and the destination location based on availability of and connectivity to wireless access points, as described with reference to FIG. 6. Furthermore, the navigation unit 808 can be a hybrid system capable of determining a most reliable route between the source location and the destination location based on availability of and connectivity to either navigation satellites or wireless access points, as described with reference to FIG. 7.

It should be noted that any one of the above-described functionalities might be partially (or entirely) implemented in hardware and/or on the processor device 802. For example, the functionality may be implemented with an application specific integrated circuit, in logic implemented in the processor device 802, in a co-processor on a peripheral device or card, etc. Further, realizations may include fewer or additional components not illustrated in FIG. 8 (e.g., additional network interfaces, peripheral devices, etc.). The processor device 802 and the network interfaces 804 are coupled to the bus 810. Although illustrated as being coupled to the bus 810, the memory unit 806 may be coupled to the processor device 802.

While the embodiments are described with reference to various implementations and exploitations, it will be understood that these embodiments are illustrative and that the scope of the inventive subject matter is not limited to them. In general, techniques for routing based on positioning network availability and reliability as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
  determining, at a navigation device, a plurality of routes between a source location and a destination location;
  for each of the plurality of routes,
    determining visibility information associated with the route, wherein the visibility information is indicative of availability of a threshold number of navigation satellites along the route, wherein the navigation satellites communicate reference signals that enable estimating a position of the navigation device;
    determining a reliability rating of the route based, at least in part, on the visibility information associated with the route, wherein the reliability rating is indicative of an ability of the navigation device to maintain continuous connectivity to the threshold number of navigation satellites along the route;

comparing the reliability ratings of the plurality of routes to identify a first route of the plurality of routes with a preferred reliability rating; and presenting the first route with the preferred reliability rating at the navigation device.

2. The method of claim 1, further comprising:

for each of the plurality of routes, determining an additional route characteristic of the route in addition to the reliability rating;

presenting a subset of the plurality of routes at the navigation device including the reliability rating of the subset of the routes and the additional route characteristic of the subset of the routes;

receiving a user selection of one of the subset of the routes; and presenting the selected route at the navigation device.

3. The method of claim 1, wherein said determining the visibility information associated with each of the plurality of routes, comprises:

for each of the plurality of routes,
determining a plurality of route segments associated with the route, wherein each of the plurality of route segments comprises a subset of the route;
determining visibility information associated with each of the plurality of route segments; and
combining the visibility information associated with each of the plurality of route segments for said determining the reliability rating of the route.

4. The method of claim 3, wherein said determining the visibility information associated with each of the plurality of route segments for each of the plurality of routes comprises:

for each of the plurality of route segments and for each of the plurality of routes,
receiving the visibility information associated with the route segment from a centralized location server, or
calculating the visibility information associated with the route segment at the navigation device.

5. The method of claim 1, wherein the location reference communication devices comprises one or more of a navigation satellite of a satellite navigation system, an access point in a wireless communication network, and a base station in a cellular network.

6. The method of claim 1, wherein the visibility information is indicative of a quality of the reference signals received from the navigation satellites.

7. The method of claim 1, wherein said determining the visibility information comprises:

for each of the plurality of routes,
identifying a plurality of navigation satellites that are visible above a predetermined mask angle associated with the navigation device at each of a plurality of sample points along the route; and
for each of the plurality of sample points along the route, analyzing each of the plurality of navigation satellites to determine whether to use the navigation satellite for navigating the navigation device.

8. The method of claim 7, wherein for each of the plurality of routes and for each of the plurality of sample points along the route, said analyzing each of the plurality of navigation satellites further comprises:

determining coordinates of the navigation device and coordinates of the navigation satellite;

determining an elevation angle and an azimuth angle to the navigation satellite based, at least in part, on the coordinates of the navigation device and the coordinates of the navigation satellite; and determining whether an obstacle is located in a line-of-sight path between the navigation device and the navigation satellite based, at least in part, on location coordinates of each of a plurality of obstacles, an elevation of each of the plurality of obstacles, the elevation angle and the azimuth angle to the navigation satellite, the coordinates of the navigation device, and the coordinates of the navigation satellite.

9. The method of claim 8, wherein for each of the plurality of routes and for each of the plurality of sample points along the route, said determining whether the obstacle is located in the line-of-sight path between the navigation device and the navigation satellite further comprises:

determining that the navigation satellite is unavailable and cannot be used for navigating the navigation device, in response to determining that the obstacle is located in the line-of-sight path between the navigation device and the navigation satellite; and determining that the navigation satellite is available and can be used for navigating the navigation device, in response to determining that there are no obstacles in the line-of-sight path between the navigation device and the navigation satellite.

10. The method of claim 1, further comprising:

for each of the plurality of routes,
determining whether the threshold number of navigation satellites are visible to the navigation device at each of a plurality of sample points along the route;
determining a first reliability rating associated with the route in response to determining that the threshold number of navigation satellites are visible to the navigation device at each of the plurality of sample points along the route; and
determining a second reliability rating associated with the route, in response to determining that the threshold number of navigation satellites are not visible to the navigation device at each of the plurality of sample points along the route, wherein the first reliability rating indicates greater reliability than the second reliability rating.

11. The method of claim 10, further comprising:

in response to determining that the threshold number of navigation satellites are not visible to the navigation device at each of the plurality of sample points along the route, determining whether connectivity to a second threshold number of access points of a wireless communication network is available;

determining that the route between the source location and the destination location is not reliable based, at least in part, on determining that the threshold number of navigation satellites are not visible to the navigation device along the route and determining that connectivity to the second threshold number of access points is not available; and calculating the second reliability rating of the route based on at least one of visibility information associated with at least one navigation satellite visible to the navigation device and visibility information associated with at least one access point, in response to determining that connectivity to the second threshold number of access points is available.

12. The method of claim 11,
wherein the visibility information associated with the at least one access point is indicative of a quality of reference signals received from the at least one access point, and
wherein determining the visibility information associated with the at least one access point for calculating the second reliability rating of the route comprises determining at least one of an effect of multipath and attenuation on the reference signals, a number of the access points available along the route, a distribution of the at least one access point along the route, a distance between the one or more access points and the navigation device, a strength of the reference signals, and authentication of the navigation device at at least one access point.

13. The method of claim 1, further comprising:
determining that the visibility information associated with the first route between the source location and the destination location is not available from a centralized location server;
determining, at the navigation device, the visibility information associated with the first route; and
communicating the visibility information associated with the first route to the centralized location server.

14. The method of claim 1, wherein said presenting the first route comprises presenting the first route with the preferred reliability rating on a display unit of the navigation device.

15. The method of claim 1, wherein for each of the plurality of routes, said determining the visibility information associated with the route comprises determining one or more of dilution of precision, multipath, availability of the navigation satellites, positioning accuracy, number of navigation satellites that are visible to the navigation device, signal to noise ratio, elevation angles, and impact of time of day on the reference signals.

16. A navigation device comprising:
a processor;
a routing unit coupled with the processor, the routing unit operable to:
determine a plurality of routes between a source location and a destination location;
a route reliability calculation unit coupled with the processor, the route reliability calculation unit operable to:
for each of the plurality of routes,
determine visibility information associated with the route, wherein the visibility information is indicative of availability of a threshold number of navigation satellites along the route, wherein the navigation satellites communicate reference signals that enable estimating a position of the navigation device; and
determine a reliability rating of the route based, at least in part, on the visibility information associated with the route, wherein the reliability rating is indicative of an ability of the navigation device to maintain continuous connectivity to the threshold number of navigation satellites along the route; and
the routing unit further operable to:
compare the reliability ratings of the plurality of routes to identify a first route of the plurality of routes with a preferred reliability rating; and
present the route with the preferred reliability rating at the navigation device.

17. The navigation device of claim 16, wherein the routing unit is further operable to:
determine an additional route characteristic of each of the plurality of routes in addition to the reliability rating;
present a subset of the plurality of routes at the navigation device including the reliability rating of the subset of the routes and the additional route characteristic of the subset of the routes;
receive a user selection of one of the subset of the routes; and
present the selected route at the navigation device.

18. The navigation device of claim 16, wherein the route reliability calculation unit operable to determine the visibility information associated with each of the plurality of routes, comprises the route reliability calculation unit operable to:
for each of the plurality of routes,
determine a plurality of route segments associated with the route, wherein each of the plurality of route segments comprises a subset of the route;
determine visibility information associated with each of the plurality of route segments; and
combine the visibility information associated with each of the plurality of route segments for the route reliability calculation unit to determine the reliability rating of the route.

19. The navigation device of claim 16, wherein the route reliability calculation unit operable to determine the visibility information comprises the route reliability calculation unit operable to:
for each of the plurality of routes,
identify a plurality of navigation satellites that are visible above a predetermined mask angle associated with the navigation device at each of a plurality of sample points along the route; and
for each of the plurality of sample points along the route, analyze each of the plurality of navigation satellites to determine whether to use the navigation satellite for navigating the navigation device.

20. The navigation device of claim 19, wherein for each of the plurality of routes and for each of the plurality of sample points along the route, the route reliability calculation unit operable to analyze each of the plurality of navigation satellites further comprises the route reliability calculation unit operable to:
determine coordinates of the navigation device and coordinates of the navigation satellite;
determine an elevation angle and an azimuth angle to the navigation satellite based, at least in part, on the coordinates of the navigation device and the coordinates of the navigation satellite; and
determine whether an obstacle is located in a line-of-sight path between the navigation device and the navigation satellite based, at least in part, on the elevation angle and the azimuth angle to the navigation satellite.

21. The navigation device of claim 20, wherein for each of the plurality of routes and for each of the plurality of sample points along the route, the route reliability calculation unit operable to determine whether the obstacle is located in the line-of-sight path comprises the route reliability calculation unit operable to:
determine that the navigation satellite is unavailable and cannot be used for navigating the navigation device, in response to determining that the obstacle is located in the line-of-sight path between the navigation device and the navigation satellite; and
determine that the navigation satellite is available and can be used for navigating the navigation device, in response to determining that there are no obstacles in the line-of-sight path between the navigation device and the navigation satellite.

22. The navigation device of claim 16, wherein the route reliability calculation unit is further operable to:
for each of the plurality of routes,
determine whether the threshold number of navigation satellites are visible to the navigation device along the route at each of a plurality of sample points along the route;
determine a first reliability rating associated with the route in response to the route reliability calculation unit determining that the threshold number of navigation satellites are visible to the navigation device along the route at each of the plurality of sample points along the route; and
determine a second reliability rating associated with the route, in response to the route reliability calculation unit determining that the threshold number of navigation satellites are not visible to the navigation device along the route at each of the plurality of sample points along the route, wherein the first reliability rating indicates greater reliability than the second reliability rating.

23. The navigation device of claim 22, wherein the route reliability calculation unit is further operable to:
in response to the route reliability calculation unit determining that the threshold number of navigation satellites are not visible to the navigation device at each of the plurality of sample points along the route, determine whether connectivity to a second threshold number of access points of a wireless communication network is available;
determine that the route between the source location and the destination location is not reliable based, at least in part, on the route reliability calculation unit determining that the threshold number of navigation satellites are not visible to the navigation device along the route and that connectivity to the second threshold number of access points is not available; and
calculate the second reliability rating of the route based on at least one of visibility information associated with at least one navigation satellite visible to the navigation device and visibility information associated with at least one access point, in response to the route reliability calculation unit determining that connectivity to the second threshold number of access points is available.

24. The navigation device of claim 16, further comprising a display unit, wherein the routing unit operable to present the first route comprises the routing unit operable to present the first route with the preferred reliability rating on the display unit of the navigation device.

25. A non-transitory machine-readable storage medium, having instructions stored therein, which, when executed by a processor causes the processor to perform operations that comprise:
determining a plurality of routes between a source location and a destination location;
for each of the plurality of routes,
determining visibility information associated with the route, wherein the visibility information is indicative of availability of a threshold number of navigation satellites along the route, wherein the navigation satellites communicate reference signals that enable estimating a position of a navigation device;
determining a reliability rating of the route based, at least in part, on the visibility information associated with the route, wherein the reliability rating is indicative of and an ability of the navigation device to maintain continuous connectivity to the threshold number of navigation satellites along the route;
comparing the reliability ratings of the plurality of routes to identify a first route of the plurality of routes with a preferred reliability rating; and
presenting the first route with the preferred reliability rating at the navigation device.

26. The machine-readable storage medium of claim 25, wherein said operation of determining the visibility information associated with each of the plurality of routes, comprises:
for each of the plurality of routes,
determining a plurality of route segments associated with the route, wherein each of the plurality of route segments comprises a subset of the route;
determining visibility information associated with each of the plurality of route segments; and
combining the visibility information associated with each of the plurality of route segments for determining the reliability rating of the route.

27. The machine-readable storage medium of claim 25, wherein said operation of determining the visibility information comprises:
for each of the plurality of routes,
identifying a plurality of navigation satellites that are visible above a predetermined mask angle associated with the navigation device at each of a plurality of sample points along the route; and
for each of the plurality of sample points along the route, analyzing each of the plurality of navigation satellites to determine whether to use the navigation satellite for navigating the navigation device.

28. The machine-readable storage medium of claim 27, wherein, for each of the plurality of routes and for each of the plurality of sample points along the route, said operation of analyzing each of the plurality of navigation satellites further comprises:
determining coordinates of the navigation device and coordinates of the navigation satellite;
determining an elevation angle and an azimuth angle to the navigation satellite based, at least in part, on the coordinates of the navigation device and the coordinates of the navigation satellite; and
determining whether an obstacle is located in a line-of-sight path between the navigation device and the navigation satellite based, at least in part, on the elevation angle and the azimuth angle to the navigation satellite.

29. The machine-readable storage medium of claim 28, wherein for each of the plurality of routes and for each of the plurality of sample points along the route, said operation of determining whether the obstacle is located in the line-of-sight path between the navigation device and the navigation satellite further comprises:
determining that the navigation satellite is unavailable and cannot be used for navigating the navigation device, in response to determining that the obstacle is located in the line-of-sight path between the navigation device and the navigation satellite; and
determining that the navigation satellite is available and can be used for navigating the navigation device, in response to determining that there are no obstacles in the line-of-sight path between the navigation device and the navigation satellite.

30. The machine-readable storage medium of claim 25, wherein the operations further comprise:

for each of the plurality of routes,
    determining whether the threshold number of navigation satellites are visible to the navigation device at each of a plurality of sample points along the route;
    determining a first reliability rating associated with the route in response to determining that the threshold number of navigation satellites are visible to the navigation device at each of the plurality of sample points along the route; and
    determining a second reliability rating associated with the route, in response to determining that the threshold number of navigation satellites are not visible to the navigation device at each of the plurality of sample points along the route, wherein the first reliability rating indicates greater reliability than the second reliability rating.

31. The machine-readable storage media of claim 30, wherein the operations further comprise:

determining whether connectivity to a second threshold number of access points of a wireless communication network is available in response to determining that the threshold number of navigation satellites are not visible to the navigation device at each of the plurality of sample points along the route;

determining that the route between the source location and the destination location is not reliable based, at least in part, on determining that the threshold number of navigation satellites are not visible to the navigation device along the route and determining that connectivity to the second threshold number of access points is not available; and calculating the reliability rating of the route based on at least one of visibility information associated with at least one navigation satellite visible to the navigation device and visibility information associated with at least one access point, in response to determining that connectivity to the second threshold number of access points is available.

\* \* \* \* \*